US006894978B1

(12) United States Patent
Hashimoto

(10) Patent No.: US 6,894,978 B1
(45) Date of Patent: May 17, 2005

(54) METHOD AND SYSTEM FOR OPERATION OF A RESILIENT CLOSED COMMUNICATION NETWORK WITHOUT A DEDICATED PROTECTION NETWORK SEGMENT

(75) Inventor: Noriaki Hashimoto, 2231-3, Angyoryo, Negishi, Kawaguchi-shi, Saitama-ken 333-0834 (JP)

(73) Assignee: Noriaki Hashimoto, Kawaguchi (JP)

( * ) Notice: Subject to any disclaimer, the term of this patent is extended or adjusted under 35 U.S.C. 154(b) by 0 days.

(21) Appl. No.: 09/523,375

(22) Filed: Mar. 10, 2000

(51) Int. Cl.[7] .............................................. G01R 31/08
(52) U.S. Cl. ........................ 370/238; 370/404; 359/59; 359/3
(58) Field of Search .................. 359/58, 59; 370/217, 370/218, 219, 220, 221, 222, 223, 224, 235, 238, 389, 400, 401, 402, 403, 404, 405, 406; 398/2, 3, 4, 5

(56) References Cited

U.S. PATENT DOCUMENTS 5,057,142 A    10/1991 Baasner et al.
5,088,032 A     2/1992 Bosack (Continued)

FOREIGN PATENT DOCUMENTS

EP    957 611 A2    11/1999

OTHER PUBLICATIONS

Charles L. Hedrick Rutgers, "An Introduction to IGRP", Aug. 22, 1991, pp. 1–22 (visited Jan. 3, 2000) <http://www.cisco.com/warp/public/103/5.html>.

Curtis Villamizar, "OSPF Optimized Multipath (OSPF–OMP)", Feb. 24, 1999, Internet Engineering Task Force INTERNET–DRAFT, draft–ietf–ospf–omp–02, pp. 1–32.

Shuu Yamamoto, "Submarine Cable that Supports International Communication—Technology for 10,000 km–long Submarine Transoceanic Cable with Increased Reliability and Traffic Volume," Nikkei Communications, 1998, pp. 123–129.

Primary Examiner—Bob A. Phunkulh
(74) Attorney, Agent, or Firm—Watchtone P & D; Stephen B. Parker

(57) ABSTRACT

A method and system for operation of a resilient closed communication network without a dedicated protection network segment. The method uses a resilient closed communication network with at least one communication ring. The method includes the steps of receiving a data packet from a first external network at a first distributing station connected to the network, identifying a second distributing station connected to the network from which the data packet is to be forwarded to a second external network, and determining functioning routes from the first distributing station to the second distributing station. The method also includes the steps of selecting an optimal route among the functioning routes and sending the data packet from the first distributing station to the second distributing station using the optimal route.

108 Claims, 14 Drawing Sheets

U.S. PATENT DOCUMENTS

| | | |
|---|---|---|
| 5,218,600 A | 6/1993 | Schenkyr et al. |
| 5,247,381 A | 9/1993 | Olmstead et al. |
| 5,341,364 A * | 8/1994 | Marra et al. ............... 370/223 |
| 5,353,283 A | 10/1994 | Tsuchiya |
| 5,448,389 A | 9/1995 | Peacock |
| 5,473,599 A | 12/1995 | Li et al. |
| 5,509,000 A | 4/1996 | Oberlander |
| 5,623,492 A | 4/1997 | Teraslinna |
| 5,657,142 A | 8/1997 | Fahim |
| 5,712,968 A | 1/1998 | Nakayama et al. |
| 5,717,796 A | 2/1998 | Clendening |
| 5,748,815 A | 5/1998 | Hamel et al. |
| 5,757,768 A | 5/1998 | Goto et al. |
| 5,826,038 A | 10/1998 | Nakazumi |
| 5,835,696 A | 11/1998 | Hess |
| 5,854,899 A | 12/1998 | Callon et al. |
| 5,870,212 A | 2/1999 | Nathan et al. |
| 5,898,691 A | 4/1999 | Liu |
| 5,903,371 A | 5/1999 | Arecco et al. |
| 5,907,417 A | 5/1999 | Darcie et al. |
| 5,917,820 A | 6/1999 | Rekhter |
| 5,933,258 A | 8/1999 | Flanagan et al. |
| 5,949,755 A * | 9/1999 | Uphadya et al. ............ 370/224 |
| 5,982,517 A | 11/1999 | Fishman |
| 5,986,783 A | 11/1999 | Sharma et al. |
| 5,991,817 A | 11/1999 | Rowett et al. |
| 5,995,503 A | 11/1999 | Crawley et al. |
| 6,532,088 B1 * | 3/2003 | Dantu et al. .................. 398/43 |

* cited by examiner

METHOD AND SYSTEM FOR OPERATION OF A RESILIENT CLOSED COMMUNICATION NETWORK WITHOUT A DEDICATED PROTECTION NETWORK SEGMENT

BACKGROUND OF THE INVENTION

1. Field of the Invention

The present invention relates to a method and system for operation of a resilient closed communication network without a dedicated protection network segment. The invention uses a plurality of devices and software to provide a resilient closed communication network.

2. Discussion of the Related Art

New transmission technologies and a wide-scale deployment of WDM (Wavelength Division Multiplexing) system carrying many independent traffic channels over the same fiber have resulted in a dramatic increase in traffic capacities of fiber optic network systems. For example, transmission links up to bit rates of 10 Gbps are in commercial service and new developments in multi-wavelength component technologies are resulting in increased commercial availability of 4-, 8-, 16-, 32-, and 40 channel WDM links.

Fiber optic network systems have been used widely in the area of communications. Their applications include: (1) a long-haul telecommunication systems on land and at sea such as ocean-spanning submarine cables and national backbone networks, to carry digitized signals simultaneously over a long distance; (2) interoffice trunks that carry many telephone conversations simultaneously between local and regional telephone switching facilities; (3) connections to Internet service providers; and (4) local-area networks.

Fiber optic network systems are vulnerable to a failure due to a breaking of an optical fiber. For example, fibers can be accidentally cut by operators not aware of their presence. Aerial cables are broken by falling branches and errant cranes. Submarine cables are cut by fishermen engaged in deep-sea fishing activities or by anchors.

Because the amount of information exchanged in a fiber optic network system is very high, a failure can have severe consequences in that a very high number of network users can be deprived of an information flow. In the past, some systems rerouted the traffic to alternative communication systems, such as satellite communication systems, in case of failure. However, satellite communication systems cannot handle a large amount of traffic handled by high-capacity fiber optic network systems. To deal with a network failure, some fiber optic communication systems rely on a dedicated protection ring or network segment, to which the traffic is switched from a failed working communication ring or network segment.

Protection rings or network segments provisioned for a dynamic restoration of service need provide a similar magnitude of capacity as working rings or network segments to serve as an effective backup or spare links for ensuring network survivability. This means that as much as a half of an available network capacity need be set aside as a protection against a network failure.

Besides high-capacity fiber optic network systems, other network system, such as those using T1 cables, often feature redundant connections to protect themselves from a failure. For example, they may use a dedicated protection ring or network segment. Alternatively, they may enforce connections between nodes by adding alternatively routes or duplicate routes. These redundant connections, however, increase a cost or building and maintaining network systems.

Thus, there is a need for providing a resilient closed network capable of automatically handling a network failure without using a protection ring or network segment and without relying on alternative communication systems such as satellite communication systems or redundant connections.

SUMMARY OF THE INVENTION

Accordingly, the present invention is directed to a method and system for operation of a resilient closed communication network without a dedicated protection network segment that substantially obviates one or more of the problems due to limitations and disadvantages of the related art.

To achieve these and other advantages and in accordance with the purpose of the present invention, as embodied and broadly described, the method for operating a resilient closed communication network with at least one communication ring includes the step of receiving a data packet from a first external network at a first distributing station connected to the resilient closed communication network. The method also includes the step of identifying a second distribution station connected to the resilient closed communication network from which the data packet is to be forwarded to a second external network and the step of determining functioning routes from the first distributing station to the second distributing station. It further includes the step of selecting an optimal route among the functioning routes and the step of sending the data packet from the first distributing station to the second distributing station using the optimal route.

In another aspect, the invention includes a method of operating a resilient closed communication network, which includes at least one communication ring and a first and a second distributing stations. Both the first and the second distributing stations are interconnected by the at least one communication ring and include a router and a packet distributor. The method includes the steps of receiving a data packet from a first external network at a first router in the first distributing station, forwarding the data packet from the first router to a first packet distributor in the first distributing station, and identifying a network address of a second router in the second distributing station from which the data packet is to be forwarded to a second external network. In addition, the method includes the steps of determining an identification number of a second packet distributor in the second distributing station, appending the identification number of the second packet distributor to the data packet, and determining functioning routes from the first distributing station to the second distributing station. The method also includes the steps of selecting an optimal route among the functioning routes and sending the data packet from the first distributing station to the second distributing station using the optimal route.

In another aspect, the invention includes a resilient closed communication network, which includes a first communication ring and at least two distributing stations interconnected by the first communication ring. Each distributing station includes means for receiving a data packet from an external network or from another distributing station, means for identifying a destination distributing station for the data packet, means for appending the identification number of the destination distributing station to the packet, and means for determining functioning routes to the destination distributing station. The distributing station further includes means for selecting an optimal route among the functioning routes and means for forwarding the data packet to an external network after removing the identification number from the data packet or to a next distributing station.

In yet another aspect, the invention includes a resilient closed communication network, which includes a first communication ring and at least two distributing stations interconnected by the first communication ring. Each distribution station includes means for receiving a data packet from an external network or from another distributing station, means for identifying a destination distributing station for the data packet, means for appending the identification number of the destination distributing station to the data packet, and means for determining functioning routes to the destination distributing station. The distributing station further includes means for selecting an optimal route among the functioning routes, means for appending a route segment data for the optimal route to the data packet, and means for forwarding the data packet to an external network after removing the identification number and the route segment data from the data packet or to a next distributing station based on the route segment data.

In a further aspect, the invention includes a resilient closed communication network, which includes a first communication ring and at least two distributing stations interconnected by the first communication ring. Each distributing station include a router capable of receiving a data packet from an external network and forwarding a data packet to the external network. It also includes a packet distributor with means for receiving a data packet from the router or another distributing station, means for identifying a destination distributing station of the data packet, means for appending the identification number of the destination distributing station to the data packet, and means for determining functioning routes to the destination distributing station. The packet distributor further includes means for selecting an optimal route among the functioning routes and means for forwarding the data packet to the router or to another distribution station.

Finally, in another aspect, the invention includes a resilient closed communication network with a first communication ring and at least two distributing stations interconnected by the first communication ring. Each distributing station includes a router capable of receiving a data packet from an external network and forwarding a data packet to the external network. It also includes a packet distributor with means for receiving a data packet from the router or another distributing station means for identifying a destination distributing station of the data packet, means for appending the identification number of the destination distributing station to the data packet, and means for determining functioning routes to the destination distributing station. The packet distributor further includes means for selecting an optimal route among the functioning routes, means for appending a route segment data for the optimal route to the data packet, and means for forwarding the data packet to the router or to another distributing station.

Additional features and advantages of the invention will be set forth in the description which follows, and in part will be apparent from the description, or may be learned by practice of the invention. The objectives and other advantages of the invention will be related and attained by the structure particularly pointed out in the written description and claims hereof as well as the appended drawings It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
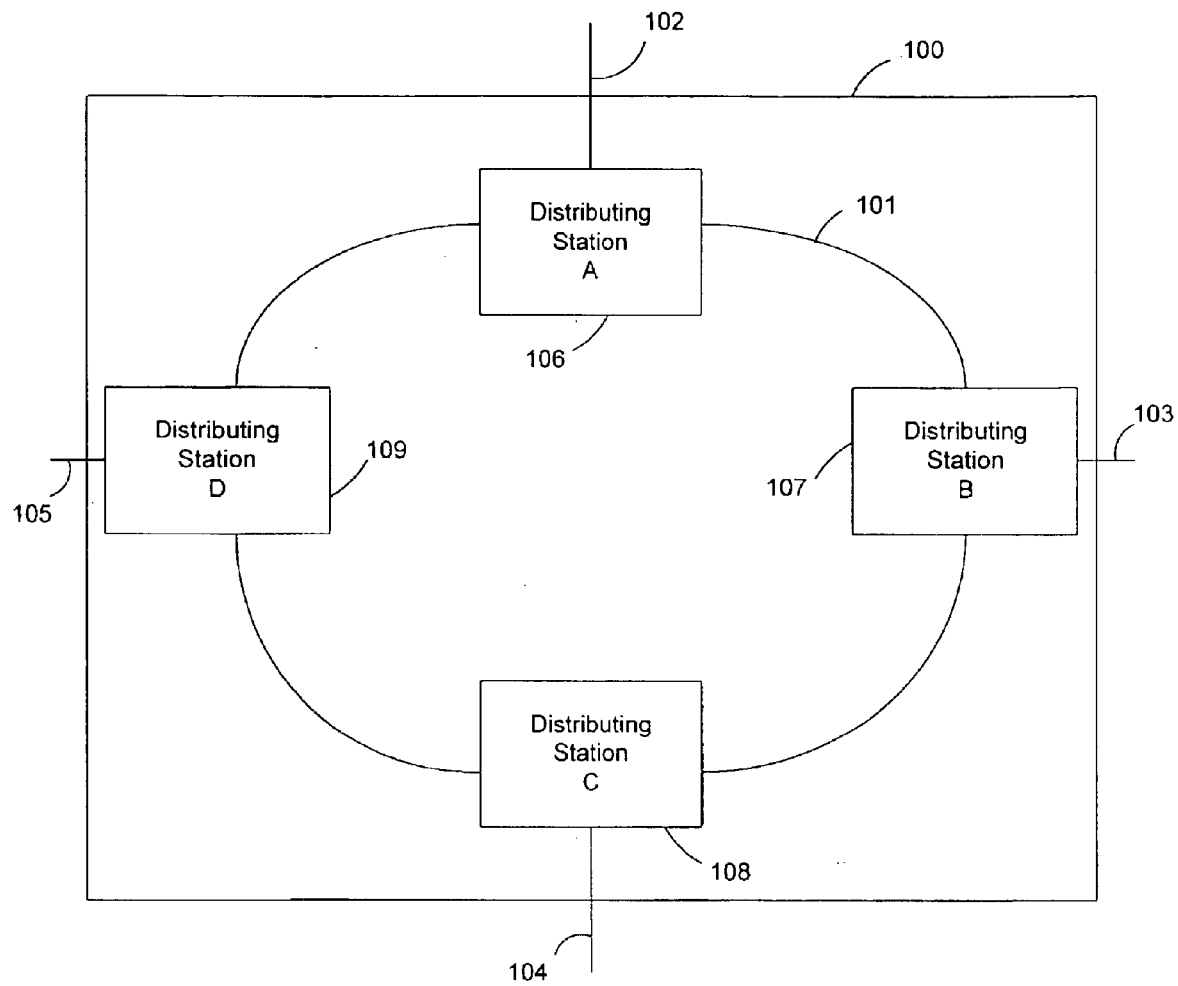
FIG. 1 is a diagram of a preferred embodiment of a resilient closed communication network of the present invention.

With reference to FIG. 1, one embodiment of a resilient closed communication network 100 includes a communication ring 101 and four distributing stations 106, 107, 108, and 109. The four distributing stations are interconnected by the communication ring 101. Each distributing station is also connected to an external network and has a unique identification number. In FIG. 1, the distributing station 106 has an identification number A and is connected to an external network 102. Similarly, the distributing stations 107, 108, and 109 have identification numbers B, C, and D, respectively, and are connected to external networks 103, 104, and 105, respectively.

Figure 2:
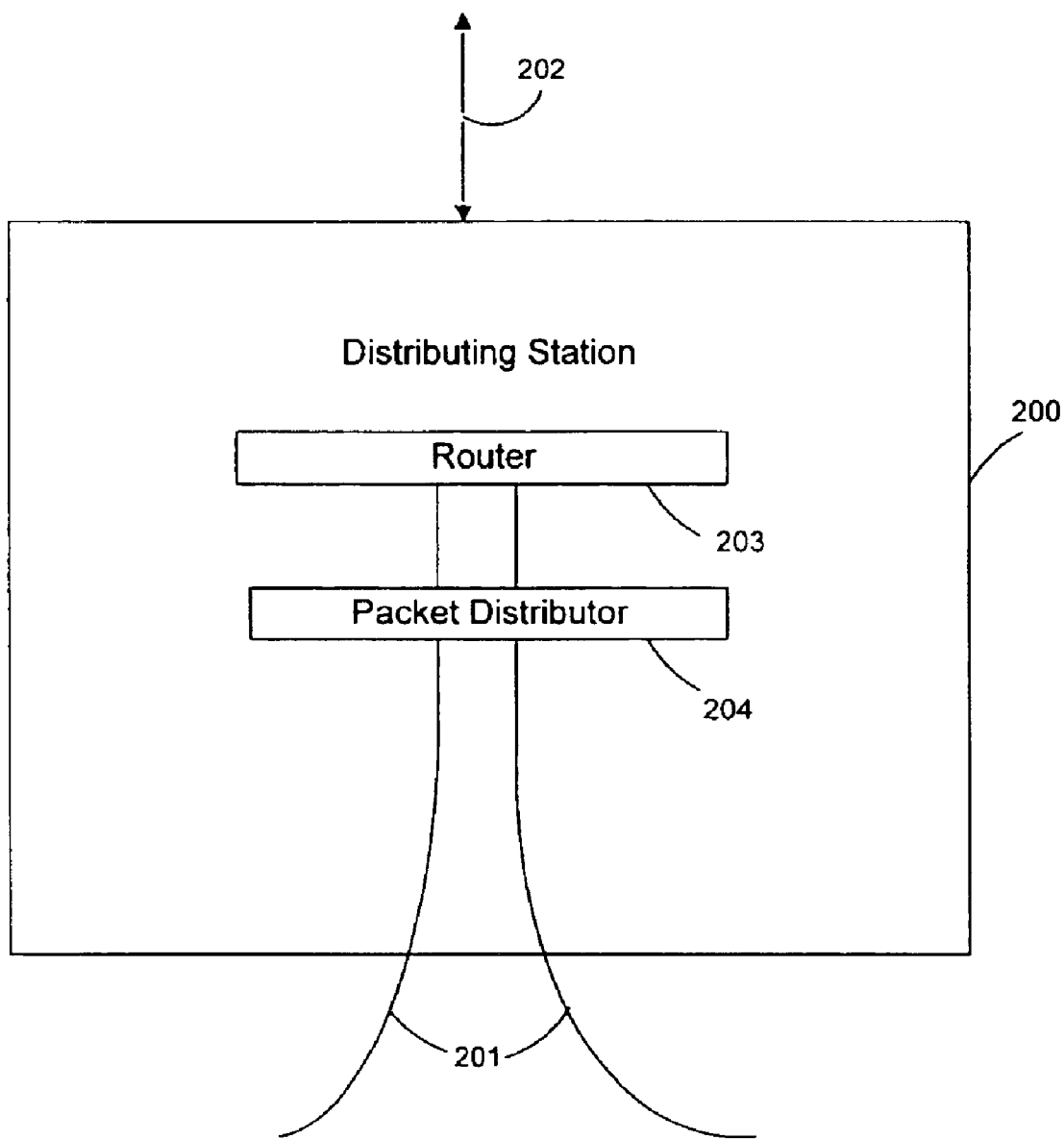
FIG. 2 is a diagram depicting one embodiment of the distributing stations of the resilient closed communication network of FIG. 1.

FIG. 2 depicts one embodiment of a distributing station 200 used in a resilient closed communication network of the present invention. The distributing station 200 is connected to a communication ring 201. It is also connected to an external network 202. It includes a router 203 and a packet distributor 204. The router 203 is capable of receiving a data packet from the external network 202. It also forwards a data packet received from the packet distributor 204 to the external network 202. The packet distributor 204 receives a data packet from the router 203 or from another distributing station in the resilient closed communication network. It also forwards a data packet to the router 203 or to another distributing station in the resilient closed communication network.

Connections between routers and packet distributors belonging to the same distributing stations need belong to the same network segment. In other words, when used an IP-based network, their IP addresses have the same network and sub-network IP addresses. For example, connections between a router and a corresponding packet distributor in the distributing stations 106, 107, 108 and 109 of FIG. 1. share the same network and sub-network IP addresses. Portions of the routers connected to external networks, on the other hand, need have different sub-network IP addresses. Furthermore, connections among packet distributors within the resilient closed communication network do not have to belong to the same network segment. Although such connections must have different sub-network IP addresses if IP-protocols are used to exchange information among packet distributions, they may share the same sub-network addresses when using non-IP-based protocols. Other methods of assigning network and sub-network IP addresses to various components of the resilient closed communication network will be known to those skilled in the art, and are within the scope of the present invention.

Figure 3:
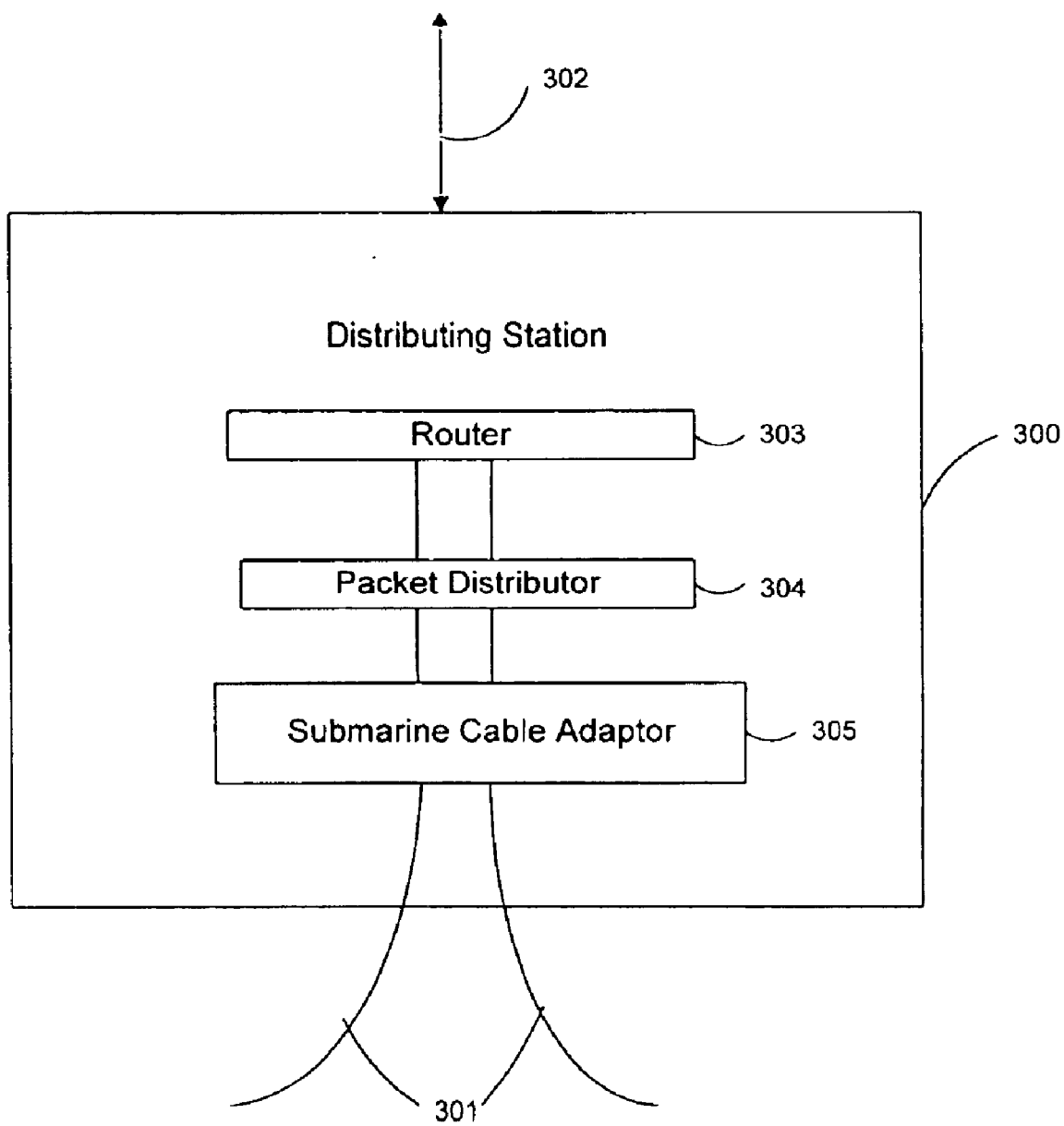
FIG. 3 is a diagram depicting another embodiment of the distributing stations of the resilient closed communication network of FIG. 1.

FIG. 3 shows another embodiment of a distributing station 300 used in a resilient closed communication network of the present invention. The distributing station 300 is particularly suitable for a use in ocean-spanning submarine fiber optic communication networks. The distributing station 300 may be used at landing points of ocean-spanning submarine fiber optic communication networks. Currently, ocean-spanning submarine fiber optic communication networks set aside a dedicated protection network segment to deal with a network failure. As described below, the distributing station 300 enables a network to effectively handle a network failure without relying on a dedicated protection network segment. In other words, the distributing station 300 eliminates a need to set aside a dedicated protection network segment within large-scale ocean-spanning submarine filter optic communication networks, thus resulting in more efficient utilization of the networks.

The distributing station 300 is connected to a communication ring 301, which is a fiber optic ring. The distribution station 300 is also connected to an external network 302. It includes a router 303, a packet distributor 304, and a submarine cable adapter 305. The router 304 is capable of receiving a data packet from the external network 302 or from the packet distributor 304. It is also capable of forwarding a data packet to the external network 302 or to the packet distributor 304. The packet distributor 304 receives a data packet from the router 303 or from another distributing station via the submarine cable adapter 305. It sends a data packet to the router 303 or to another distributing station via the submarine cable adapter 305. Although FIG. 3 features the submarine cable adapter 305 inside the distributing station 300, the submarine cable adapter 305 may reside outside the distributing station 300 as a separate component.

While the distributing stations depicted in FIGS. 2 and 3 feature a router and a packet distributor, it is not necessary to have both a router and a packet distributor. Those skilled in the art would know that one could implement operations performed by a router and a packet distributor in one device. For example, existing routers, such as those currently used in a closed communication network, may be programmed to implement the resilient closed communication network of the present invention.

Figure 4:
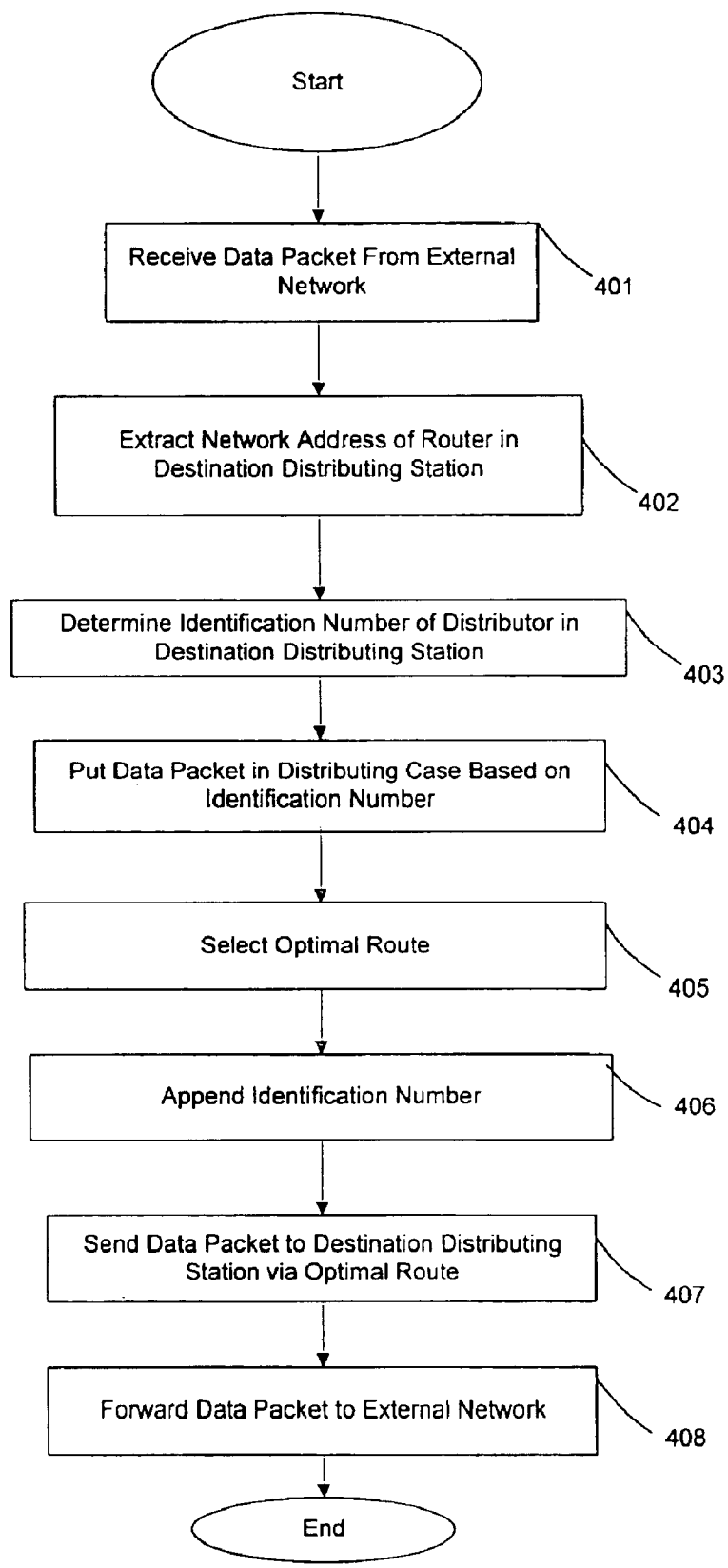
FIG. 4 is a flow chart depicting one embodiment of one aspect of an operation performed by a distributing station of the present invention.

FIG. 4 depicts one embodiment of one aspect of an operation performed by a distributing station that receives a data packet from its external network. The operation depicted in FIG. 4 may be implemented using computer programs that run on devices within the distributing station, such as a router and a packet distributor.

The distributing station receives a data packet from an external network at step 401. When using the distributing stations shown in FIGS. 2 and 3, a router is used at step 401. At step 402, a network address of a destination distributing station is extracted from the data packet. A destination distributing station is a station from which the data packet is to be forwarded out of the resilient closed communication network to an external network. A network address of the destination distributing station may be an IP address of a router inside the destination distributing station. At step 403, an identification number for the data packet is determined based on the network address of the destination distributing station. While the network address of the destination distributing station may used as an identification number, it is preferable to assign a short unique identification number to each distributing station within the resilient closed communication network. Each distributing station usually maintains a table containing an identification number and a network address of each distributing station within the resilient closed communication network. When using the distributing stations shown in FIGS. 2 and 3, a packet distributor typically performs steps 402 and 403.

At step 404, the data packet is sorted based on the identification number determined in step 403. While such sorting is not necessary, it is recommended to increase a performance of a distributing station. When using the distributing stations shown in FIGS. 2 and 3, a packet distributor is used during the sorting step.

Figure 6:
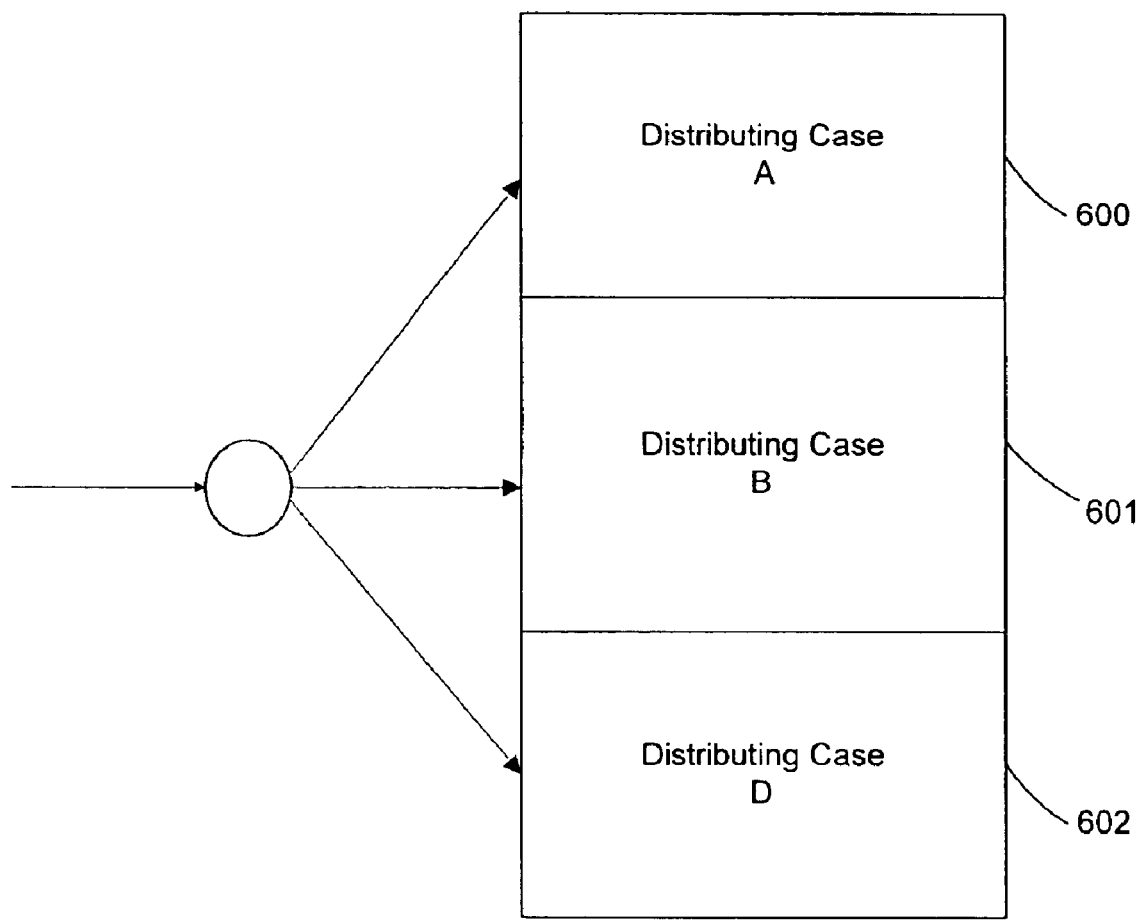
FIG. 6 depicts one embodiment of a data structure used by a distributing station to sort data packets as anticipated by the present invention.

In implementing this step, each packet distributor may maintain a list of distributing cases. For example, FIG. 6 shows a list of distributing cases 600, 601, and 602 for the packet distributor in the distributing station 108 in FIG. 1. The three distributing cases 600, 601, and 602 corresponding to the three possible destination distributing stations for a data packet entering into the distribution station 108 from the external network 104, namely the distributing stations 106, 107, and 109 or A, B, and D. At step 404, a data packet that has A as its identification number, for example, is put in the distributing case A 600. Similarly, the distributing case B 601 is used for data packets with an identification number B and the distributing case D 602 is used for data packets with an identification number D.

Figure 11:
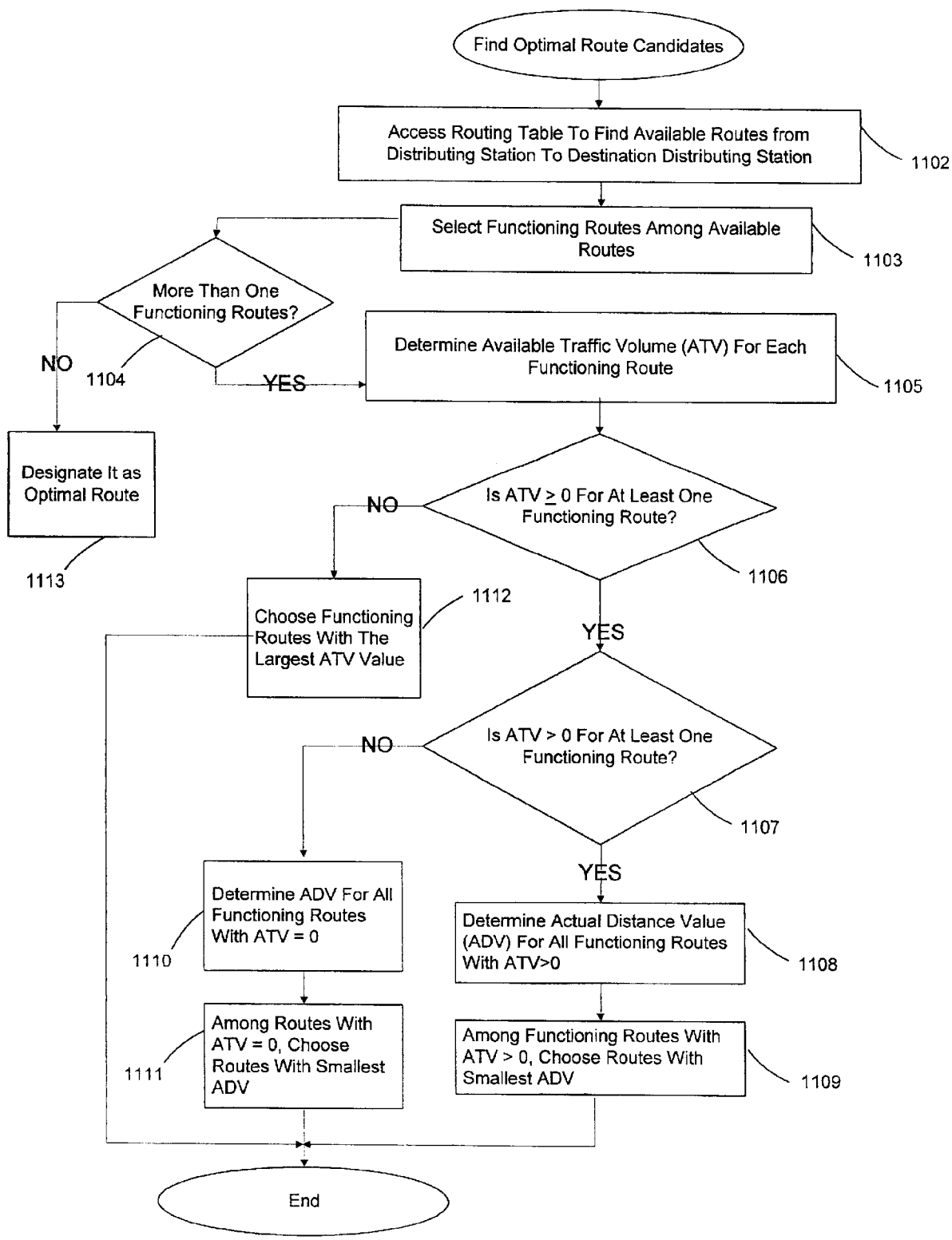
FIG. 11 is a flow chart depicting one embodiment of a process used to select optimal route candidates as anticipated by the present invention.
Figure 12:
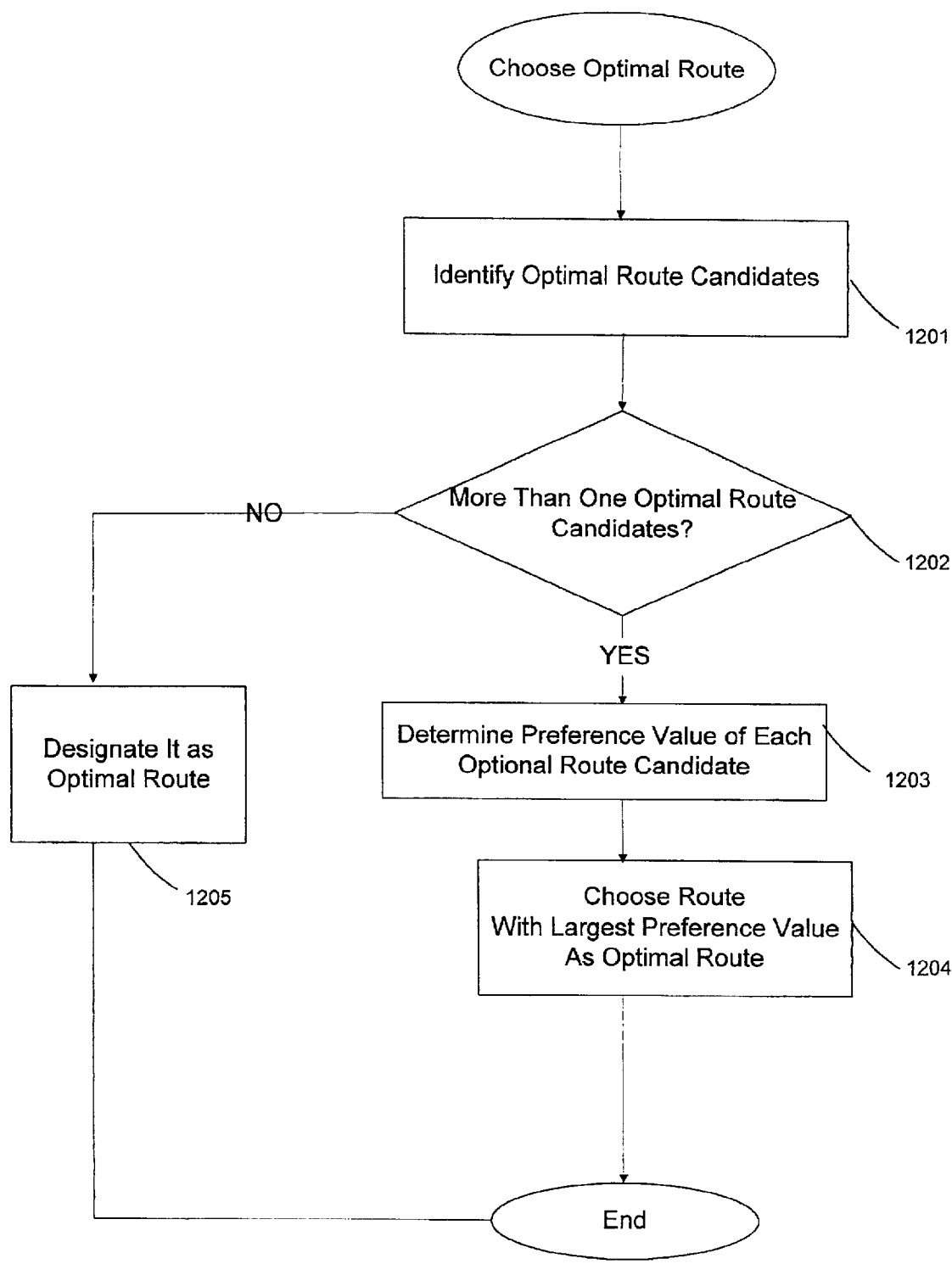
FIG. 12 is a flow chart depicting one embodiment of a process used to choose an optimal route as anticipated by the present invention.

At step 405, an optimal route is determined. Optimization factors considered in determining an optimal route includes an available traffic volume, an actual distance value, and a preference value. An available traffic volume indicates a utilization level of a route. An actual distance value represents a length of a route. A preference value represents a preference or policy of a network operator. The three factors are discussed below in depth using one embodiment of the step 405 as illustrated in FIGS. 11 and 12. Although all three factors are used to determine an optimal route in the embodiment illustrated in FIGS. 11 and 12, it is not required to do so.

Figure 7:
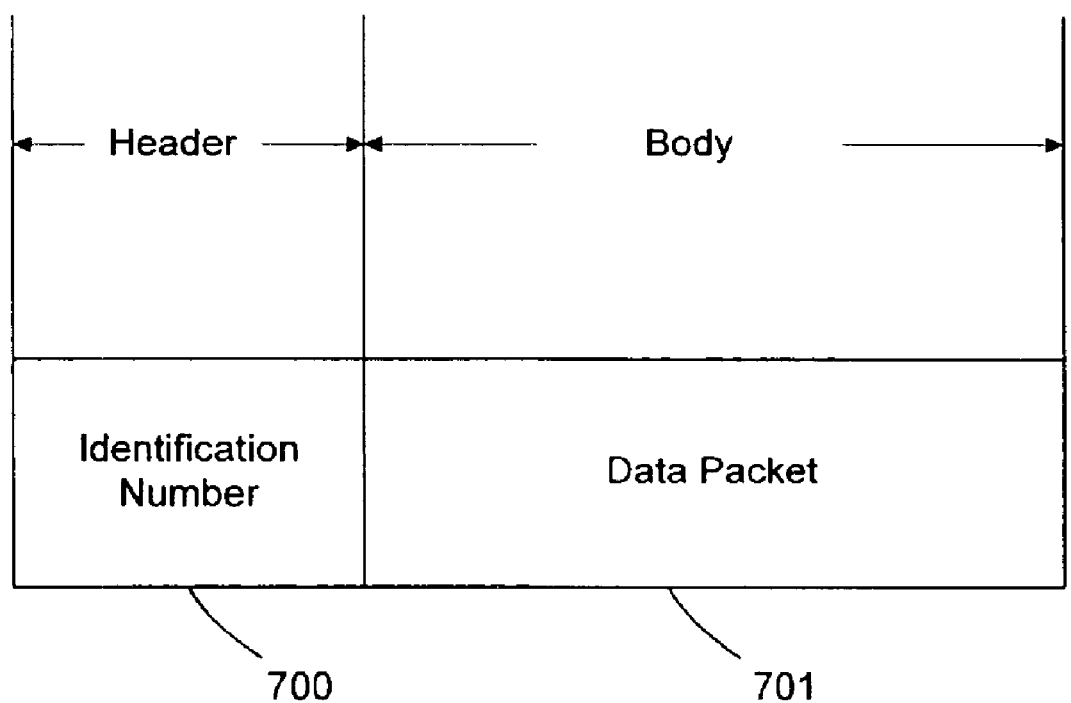
FIG. 7 depicts one embodiment of a data packet with an identification number as anticipated by the present invention.

At step 406, the identification number is appended to the data packet. Referring to FIG. 7, the identification number may be appended as a header 700 to the data packet 701. The size of a header depends on the number of distributing stations in a resilient closed communication network. For the network in FIG. 1, the header need be at least two-bit long. Alternatively, the identification number may be appended as a tailer to a data packet or using an IP tunneling method. At step 407, the data packet is sent to the destination distributing station using the optimal route determined in step 405. When using the distributing stations shown in FIGS. 2 and 3, a packet distributor performs steps 405 through 407.

At step 408, the data packet is forwarded to an external network connected to the destination distributing station. When using the distributing stations shown in FIGS. 2 and 3, a packet distributor in the destination distributing station receives the data packet and forwards it to a router in the destination distributing station. Then the router forwards the data packet to the external network.

Figure 5:
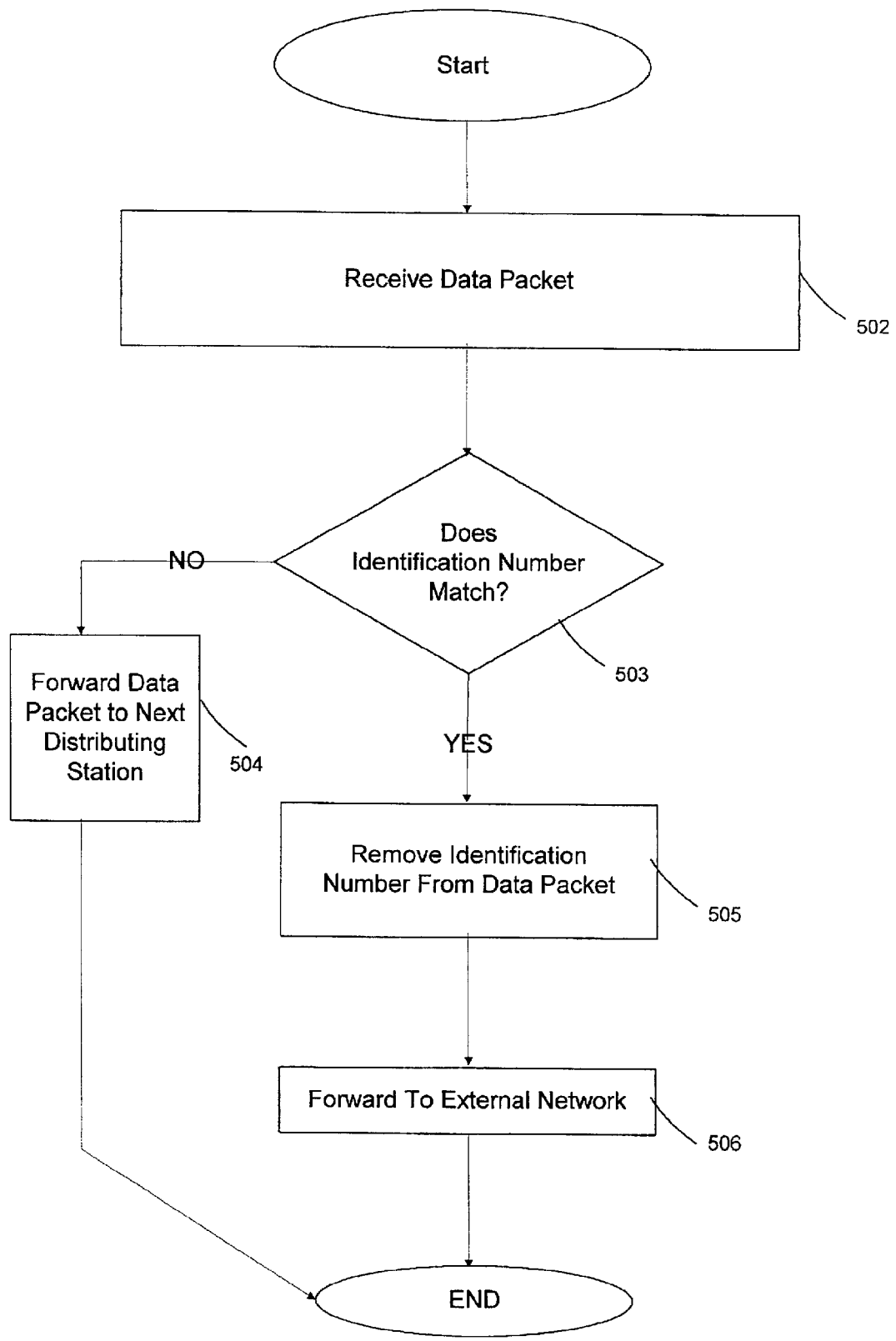
FIG. 5 is a flow chart depicting one embodiment of another aspect of an operation performed by a distributing station of the present invention.

FIG. 5 depicts an operation performed by a distributing station that receives a data packet from another distributing station in a resilient closed communication network of the present invention. At step 502, the distributing station receives a data packet from another distributing station. At step 503, it compares the identification number appended to the data packet with its own identification number. If they are the same, the distributing station is the destination distributing station for the data packet and thus forwards the data packet to the external network When using the distributing stations shown in FIGS. 2 and 3, steps 502 through 505 are performed by a packet distributor in the distributing station. As to step 506, a packet distributor forwards the data packet to a router in the same distributing station and then the router forwards it to the external networks.

If there is no match, the data packet is forwarded to a next distributing station at step 504. The next distributing station must be different from the distributing station from which the data packet was received. When using the distributing stations showed in FIGS. 2 and 3, a packet distributor performs step 504.

Figure 8:
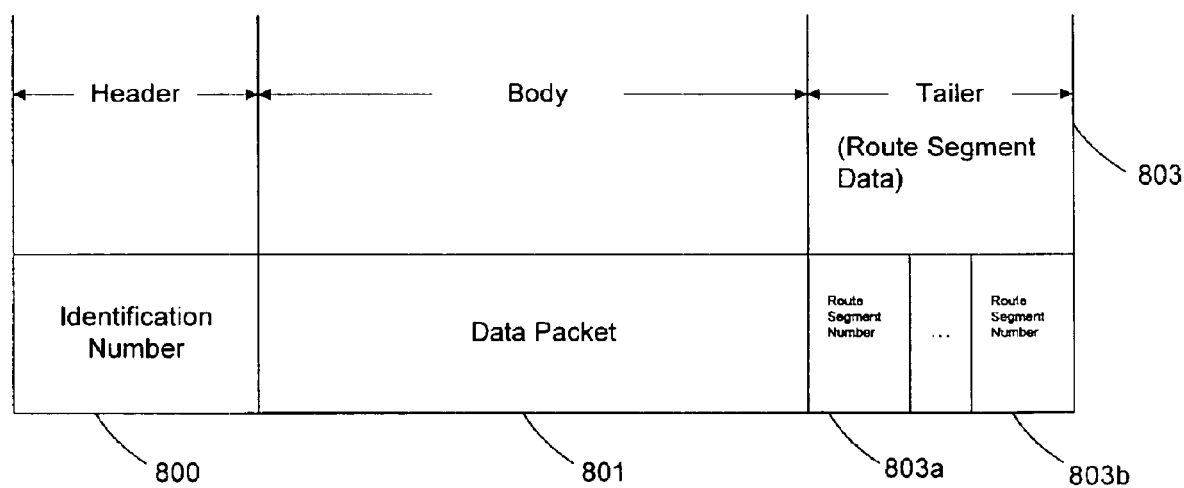
FIG. 8 depicts another embodiment of a data packet with an identification number and a route segment data as anticipated by the present invention.

FIG. 8 shows a data packet 801 with an identification number 800 and a route segment data 803. A route segment data is a list of a plurality of route segment numbers 803a, 803b, etc. In FIG. 8, the identification number 800 is appended to the data packet 801 as a header, and the route segment data 803 as a tailer.

Figure 10:
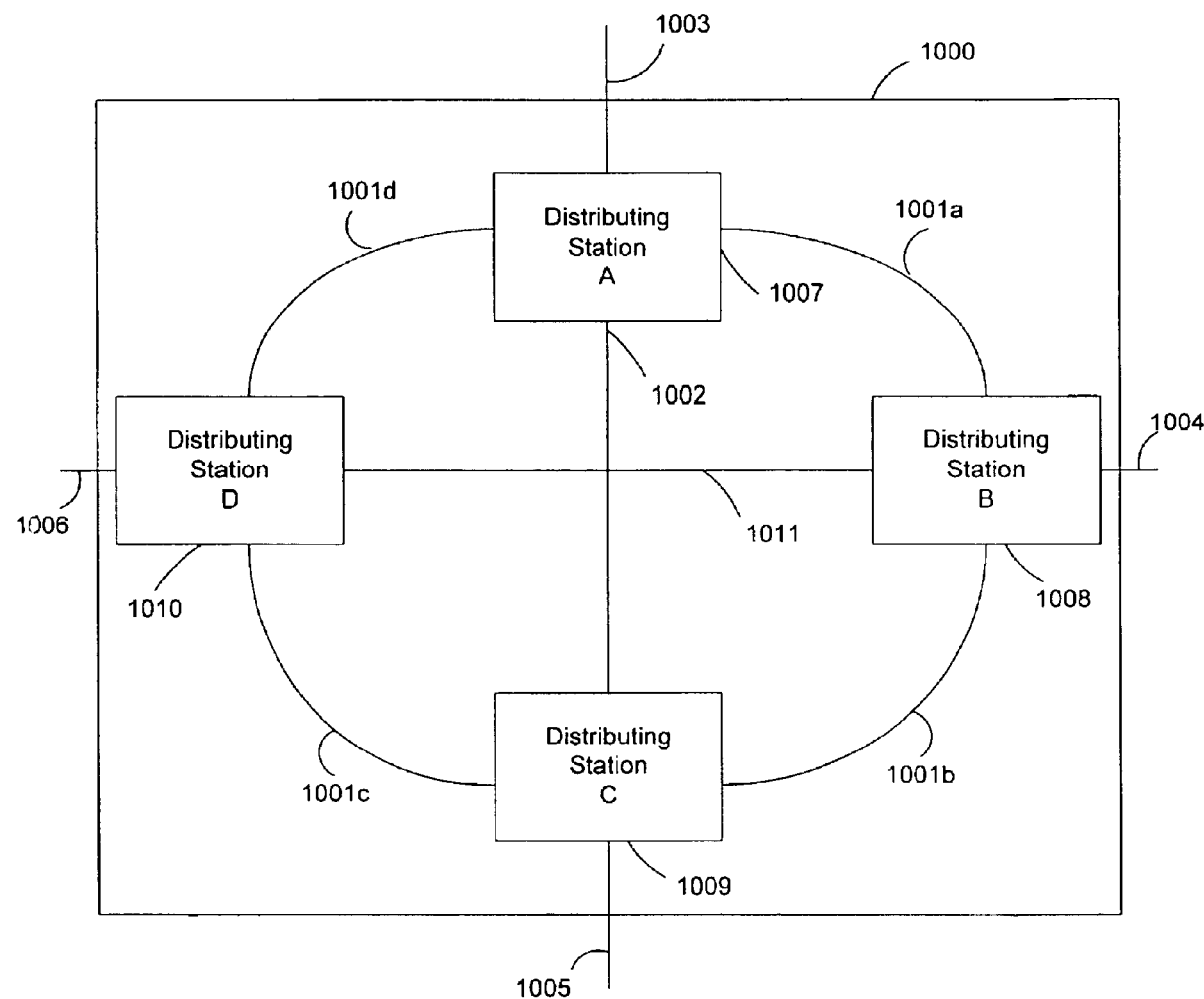
FIG. 10 is a diagram depicting another embodiment of a resilient closed communication network of the present invention.

It is not necessary to identify a route segment data 803 for a resilient closed communication network with one communication ring, such as one shown in FIG. 1. A route segment data 803, however, is needed for a resilient closed communication network with at least one distributing station connected to more than one communication lines, such as one shown in FIG. 10. In FIG. 10, a resilient closed communication network 1000 includes a communication ring 1001 and two communication lines 1002 and 1011. It also includes four distributing stations 1007, 1008, 1009, and 1010. The distributing stations 1007, 1008, 1009, and 1010 are connected to external networks, 1003, 1004, 1005, and 1006, respectively.

The four distributing stations divide the communication ring 1001 into four route segments 1001a, 1001b, 1001c and 1001d. The communication lines 1002 and 1011 have one route segment 1002 and 1011. Each route segment is given a route segment number and each distributing station maintains information on route segment numbers for all the route segments within the resilient closed communication network.

Referring back to FIG. 8, the route segment data 803 consisting of route segment numbers is appended to the data packet 801 as a tailer. The route segment data 803 is appended before the data packet leaves a distributing station in which its optimal route is determined. It may be added along with the identification number 800. A route segment data may be added as a header, a tailer, or using an IP tunneling method.

Figure 9:
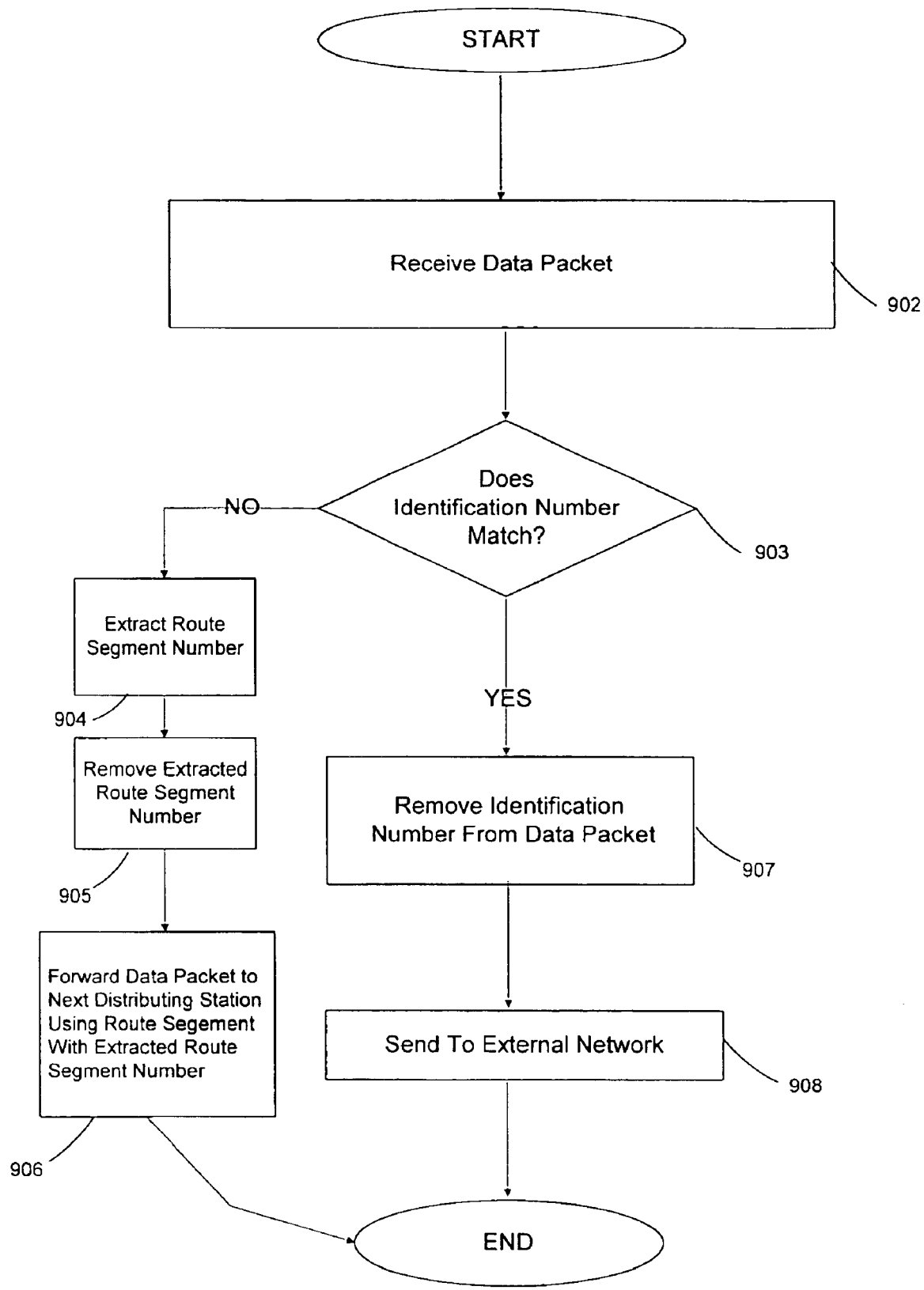
FIG. 9 is a flow chart depicting one embodiment of an operation performed by a distributing station of the present invention.

FIG. 9 illustrates how a data packet with both an identification number and a route segment data is processed by a distributing station. In this embodiment, a route segment data is a list containing route segment numbers of the optimal route in a reverse order and is appended to the data packet as a tailer as shown in FIG. 8. At step 902, a distributing station receives a data packet with an identification number and a route segment data from another distributing station. At step 903, the distributing station checks whether its identification number is the same as the identification number appended to the data packet. If so, it removes the identification number from the data packet and forwards the data packet to an external network. Otherwise, it extracts a route segment number from the route segment data at step 904 and removes the extracted route segment number from the route segment data at step 905. It then forwards the data packet to a next distributing station using a route segment with the extracted route segment number at step 906. When using the distributing stations shown in FIGS. 2 and 3, steps 902 through 907 are typically performed by a packet distributor and step 908 is performed using both a packet distributor and a router.

The process illustrated in FIG. 9 is further explained using an example. The example uses a resilient closed communication network shown in FIG. 10 and a distributing station shown in FIG. 2. A data packet enters the resilient closed communication network via the external network 1003. The data packet is, thus, received by a router in the distributing station A and is forwarded to a packet distributor for processing. The packet distributor first determines the destination packet distributor for the data packet, which, we assume, is the distributing station B. If the packet distributor in the distributing station A 1007 determines that an optimal route between the distributing station A 1007 and the distributing station B 1008 consists of route segments 1001d, 1001c, and 1001b, a route segment data is a list containing 1001c and 1001b. It is not necessary to add the route segment 1001d to the list. The route segment data is appended to the data packet as a tailer. The identification number B is also appended to the data packet as a header. The data packet is then sent to the distributing station D 1010 using the route segment 1001d. At the distributing station D 1010, the packet distributor first compares its identification number with the identification number contained in the header of the data packet. Since they are different, it extracts a route segment number 1001c from the route segment data appended to the data packet. After removing the extracted route segment number from the data packet, it sends the data packet to the distributing station C 1009 using the route segment 1001c. The packet distributor in the distributing station C 1009 receives the data packet and determines that its identification number is different from the identification number in the header of the data packet. It extracts the route segment number 1001b from the route segment data and then removes it. At this point, all the route segment numbers are removed. In other words, the data packet no longer has a tailer. Then, the packet distributor in the distributing station C 1009 forwards the data packet to the distributing station B 1008 using the route segment 1001b. The packet distributor in the distributing station B 1008, after determining that its identification number is the same as the identification number contained in the data packet, removes the identification number and forwards the data packet to the router in the distributing station B 1008. Finally, the router forwards the data packet to the external network 1004.

FIG. 11 is a flow chart illustrating how optimal route candidates are selected. When using the distributing stations in FIGS. 2 and 3, a packet distributor performs the operation illustrated in FIG. 11.

A distributing station maintains a routing table including all available routes between it and the other distributing stations in a resilient closed communication network. When using the distributing stations shown in FIGS. 2 and 3, a packet distributor typically maintains such a routing table. If a database in FIG. 6 is used to sort data packets according to their destinations, a distributing station may maintain a separate routing table for each distributing case. In other words, each distributing case has a routing table listing all available routes to the corresponding distributing station.

With reference to FIG. 11, a distributing station finds available routes to a destination distributing station by accessing a routing table at step 1102. At step 1103, the distributing station determines which of the available routes are functional by electrically checking a connection of route segments.

Route segment connection information is communicated among the distributing stations in the resilient closed communication network. When using distributing stations with a router and a packet distributor, one may assign a private network address, such as a private IP address, to each packet distributor within the resilient closed communication network to facilitate communication among the packet distributors. Furthermore, each packet distributor maintains a inter-distributor communication router table, which contains a list of routes to be used to send route segment connection information to the other packet distributors within the resilient closed communication network. The inter-distributor communication route table may contain one or more routes to a destination packet distributor. The inter-distributor communication route table is typically maintained by a network administrator and its entries remain the same unless changed by the network administrator. Using a route specified in the inter-distributor communication route table, each packet distributor is to send route segment connection information regarding route segments adjacent to it to the other packet distributors.

An IP-based protocol may be used to send a data packet containing route segment connection information. A data packet used to send route segment connection information may include a route segment number, its connection status, and a private network address or an identification number of a destination packet distributor. In addition, the data packet may include a time stamp indicating when a route segment connection information was gathered.

When the data packet arrives at the destination packet distributor, the destination packet distributor sends an acknowledgement data packet to the packet distributor that originally sent the data packet. The destination packet distributor also updates route segment connection information, if necessary. When updating, it checks a time stamp to make sure that the data packet contains more recent information.

The packet distributor keeps resending a data packet until it receives an acknowledgement data packet. For example, if the packet distributor does not receive an acknowledgement data packet within a first predetermined amount of time, it resends a data packet using the same route. It may resend the data packet again if it does not receive an acknowledgement data packet within another first predetermined amount of time. If an acknowledgement data packet does not arrive within a second predetermined amount of time, it may resend a data packet using an alternative route specified in the inter-distributor communication route table.

Instead of using the IP-protocol based method described above to communicate route segment connection information, other existing protocols, such as Transport Control Protocol (TCP) as described in Christian Huitema, *Routing in the Internet* (2nd ed. 1999), may be used. Alternatively, the above method may be altered so that a data packet travels within the resilient closed optical communication network until all the packet distributors receive the data packet.

Each distributing station maintains a table containing route segment connection information for each route segment within the closed resilient communication network. At step 1103, the distributing station uses this table to select functioning routes among available routes. Specifically, for each available route, it checks connection information for every router segment that comprises the available route. If every route segment is connected or functioning, then the available route is considered a functioning route.

At step 1104, the distributing station determines whether there are at least two functioning routes. If so, it continues to step 1105. If there is only one functioning route, the distributing station designates it as an optimal route at step 1113.

At step 1105, the distributing station calculates an available traffic volume for each functioning route. The distributing station maintains a table of available traffic volumes for every route segment in the resilient closed communication network. An available traffic volume is a difference between an effective traffic volume for a route segment and an actual traffic volume for that route segment. Initially, an available traffic volume of a route segment may equal an effective traffic volume of that route segment. Alternatively, a network operator may assign an arbitrary value. Once the resilient closed communication network begins to operate, an available traffic volume is updated periodically to convey network congestion information in real time.

An actual traffic volume is determined by measuring a size of data packets that are sent through a route segment. An actual traffic volume is measured in terms of bits per second. Each distributing station is responsible for measuring an actual traffic volume of route segments that are directly connected to it and for communicating the values to the other distributing stations in the resilient closed communication network. The distributing stations may update an actual traffic volume periodically, such as every 10 seconds.

The distributing stations may be programmed measure actual traffic volumes at the same time. To facilitate a simultaneous measuring of actual traffic volumes, the closed resilient communication network may use an internal clock.

The distributing stations communicate actual traffic volumes using an inter-distributor communication method similar to the one used to communicate route segment connection information. A data packet for communicating an actual traffic volume would contain an actual traffic volume, a corresponding route segment number, and a time stamp indicating when the actual traffic volume was measured. It may further include a network address or an identification number of a destination packet distributor. Each packet distributor may maintain a table containing actual traffic volumes for every route segment within the resilient closed communication network. Whenever a packet distributor receives a data packet containing an actual traffic volume, a corresponding entry in the table is updated, if necessary.

The effective traffic volume is an amount of data that a route segment can handle, expressed in terms of bits per second. This volume is typically set by a network operator and is less than or equal to the maximum traffic volume that the route segment can handle.

To calculate an available traffic volume for a functioning route between two distributing stations, a distributing station first determines an available traffic volume for each route segment of the functioning route. The available traffic volume of the functioning route equals the smallest available traffic volume among the available traffic volumes of its route segments.

At step 1106, the distributing station determines whether there is at least one functioning route with an available traffic volume that is greater than or equal to zero. If not, it chooses functioning routes with the largest available traffic volume as optimal route candidates at step 1112. Otherwise, it determines whether at least one functioning route has an available traffic volume that is greater than zero at step 1107.

If the largest available traffic volume is zero, it determines an actual distance value for each functioning route that has zero as its available traffic volume at step 1110. At actual distance value is a distance between a distributing station that receives a data packet from an external network and a destination distributing station from which the data is forwarded to another external network. Typically, each distributing station maintains a distance table containing a length of each route segment, which is predetermined by a network operator. Instead of maintaining a distance table, a distributing station may record an actual distance value for each route in its routing table. To determine an actual distance value for functioning route, the distributing station accesses the distance table to obtain length of all the route segments for the functioning route. The actual distance value of the functioning route equals the sum of the lengths of it route segments. At step 1111, the distributing station chooses among the functioning routes with the available traffic volume of zero, those with the smallest actual distance value as optimal route candidates.

If at least one functioning route has a positive available traffic volume, the distributing station calculates an actual distance value for each functioning route with a positive available traffic volume at step 1108. Among the functioning routes with a positive available traffic volume, it chooses those with the smallest actual distance value as optimal route candidates at 1109.

FIG. 12 illustrates one embodiment of a process used to select an optimal route among optimal route candidates determined at step 1201. If there is only one optimal route candidate, then it is designated as an optimal route, as illustrated in steps 1202 and 1205. If there are at least two optimal route candidates, the distributing station calculates a preference value for each optimal route candidate at 1203. When using the distributing stations shown in FIGS. 2 and 3, a packet distributor typically performs the steps in FIG. 12 and maintains a data, such as a preference value table, that is necessary to perform the steps.

A preference value is used to designate certain routes as preferred routes. A network operator typically sets preference values. A distributing station may maintain a preference value table. A preference value table, for example, may contain a list of preferred routes. At step 1203, a distributing station then gives a preference value of one to those optimal route candidates listed in the preference table and zero to those that are not listed. Alternatively, a preference table may contain a preference value for each route segment and a preference value of an optimal route candidate may be defined as a sum of preference values of its route segments. Then at step 1203, a distributing station calculates preference values for each optimal route candidate by adding preference values of its route segment.

At step 1204, the distributing station chooses an optimal route candidate with the largest preference value as an optimal route. If two or more optimal route candidates have the same preference value, then the distributing station may choose one arbitrarily. Instead of using a preference value, as illustrated in FIG. 12, one may randomly choose any one of optimal route candidates as an optimal route.

Figure 13:
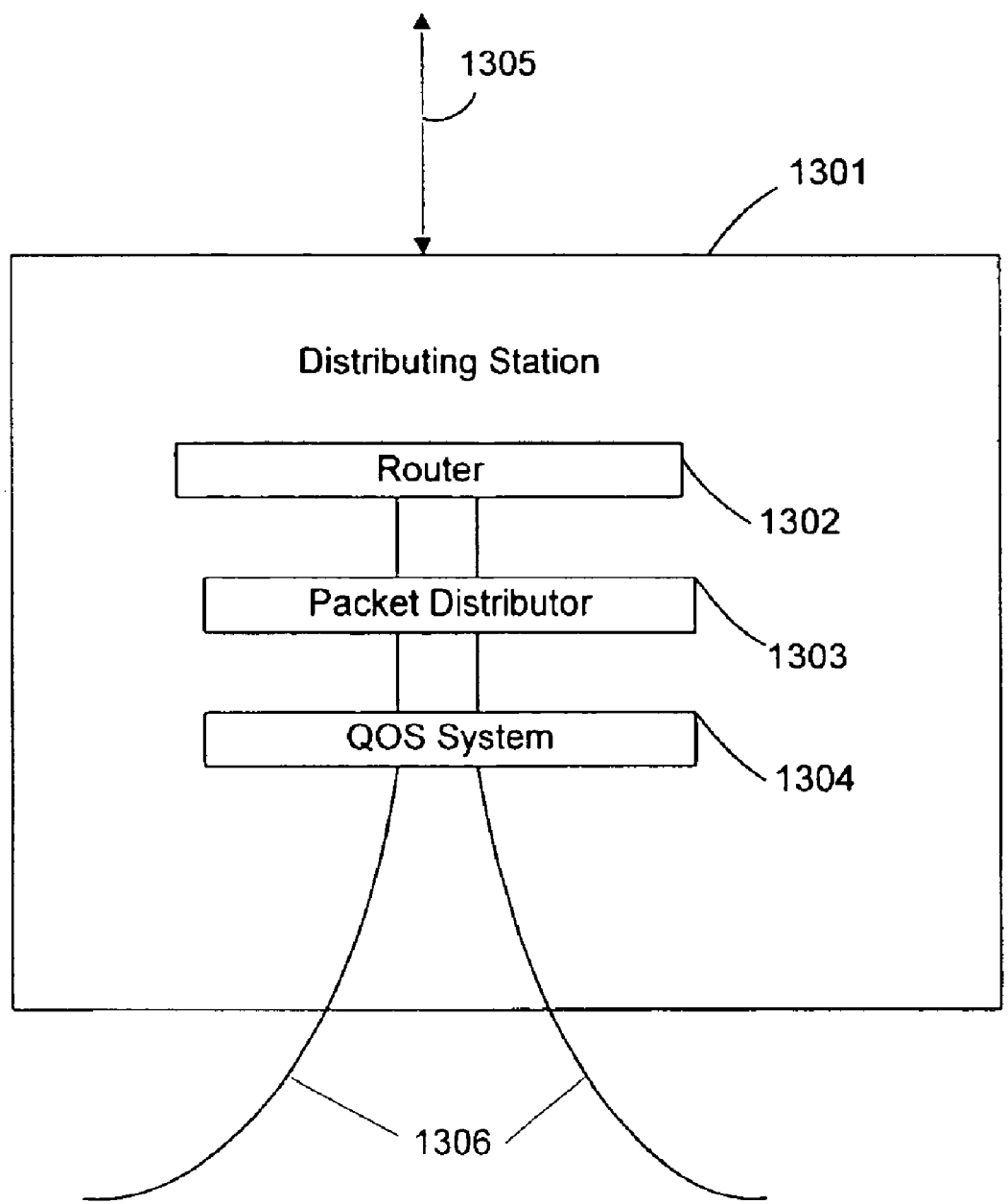
FIG. 13 is a diagram depicting one embodiment of a distributing station with a quantity of control (QOS) system.

FIG. 13 is a diagram showing a distributing station 1301 that is connected to an external network 1305 and a communication ring 1306. The distributing station 1301 has a router 1302, a packet distributor 1303, and a quality of service (QOS) system 1304. The QOS system 1304 is used to control a flow of data packets within the resilient closed communication network. Although FIG. 13 shows the QOS system 1304 inside the distributing station 1301, the QOS sytem 1304 may reside outside the distributing station 1301 as a separate component. Alternatively, a QOS system may be installed for each route segment. Specifically, two QOS systems may be installed outside the distributing station 1301, assigning one QOS system to each route segment directly connected to the distributing station 1301. Moreover, the functions performed by a router 1302, a packet distributor 1303, and a QOS system 1304 may be implemented in one device.

Figure 14:
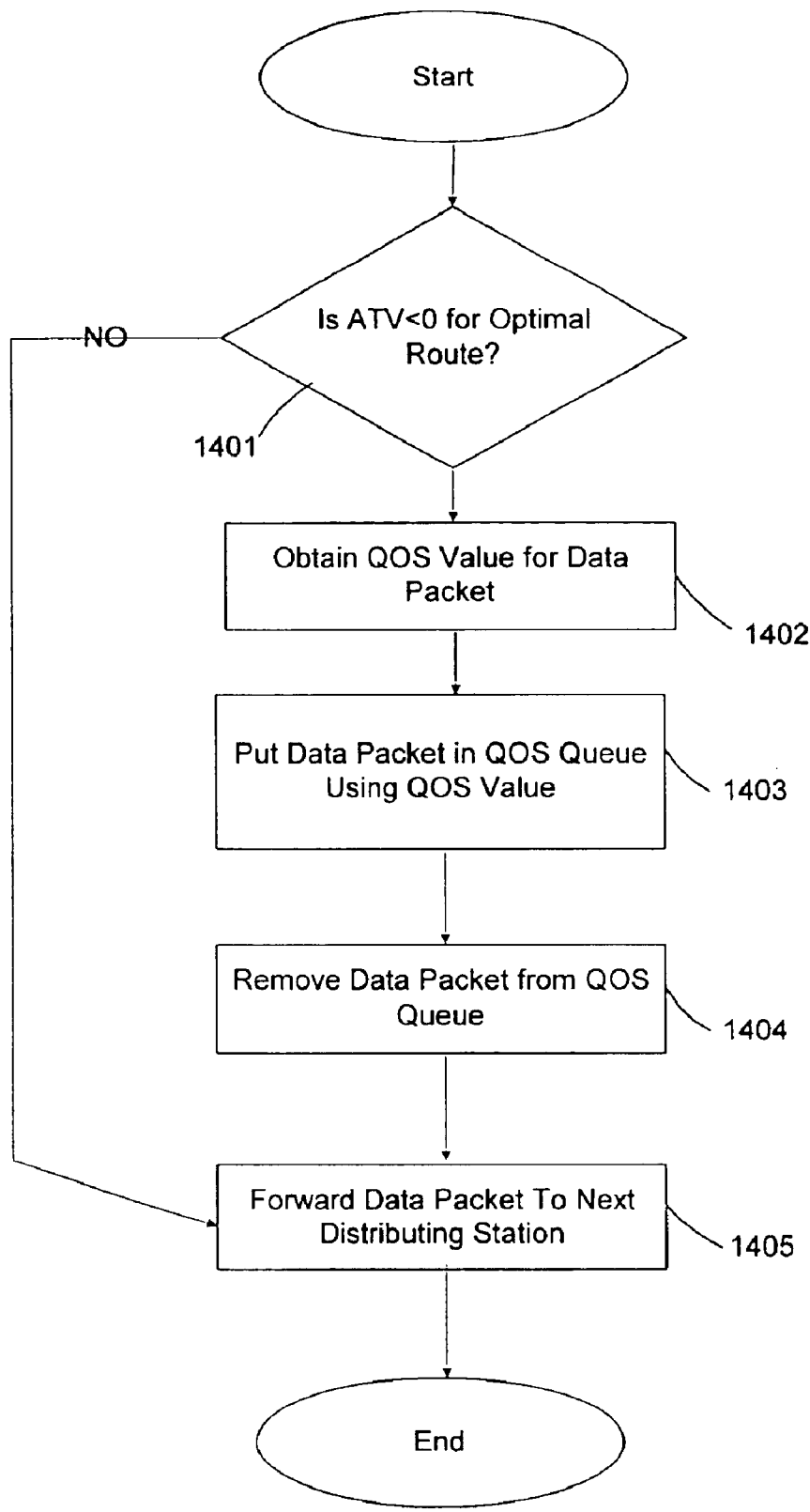
FIG. 14 is flow chart depicting one embodiment of an operation performed by a QOS system as anticipated by the present invention.

FIG. 14 depicts one embodiment of an operation performed by a QOS system. At step 1401, the QOS system checks whether an optimal route has a negative available traffic volume. If the optimal route has a negative available traffic volume, then the QOS system is used. Otherwise, the data packet is sent to the next distributing station. In other words, the QOS system is not used when an optimal route has a non-negative available traffic volume. Only when an optimal route has a negative available traffic volume, that is when an actual traffic volume of at least one route segment of the optimal route exceeds an effective traffic volume of that segment, the QOS system is turned on. Once the resilient closed communication network becomes uncongested, that is once an available traffic volume for an optimal route becomes greater than or equal to zero, the QOS system is turned off and the data packet is immediately sent to the next distributing station at 1405.

If the optimal route has a negative actual traffic volume, the QOS system assigns a QOS value to the data packet at step 1402. The QOS value represents a sending priority assigned to that data packet. For example, the system may decide to send data packets originating from an Internet service provider X before sending data packets from an Internet service provider Y, when the system is congested. The QOS system may maintain a QOS table assigning a QOS value based on information contained in a transport layer of a data packet using an Open Systems Interconnection (OSI) model. At step 1403, the data packet is placed in a QOS queue based on its QOS value. The QOS queue is managed so that the data packet with the highest QOS value is sent first. To avoid an infinite delay, it may increase a QOS value of data packets in the queue periodically. The size of QOS queue depends on an effective traffic volume of a route segment connected to it. At step 1404, the data packet is removed from the QOS queue and sent to the next distributing station at 1405.

While FIG. 13 shows the QOS system 1304 as a separate system, it may be incorporated into the packet distributor 1303. If the QOS system is a separate system as shown in FIG. 13, it is necessary to allow a communication between the QOS system and the distributing station, so that the QOS system has an access to available traffic volumes. An electronic circuit may be used to connect the QOS system and the distributing station. Furthermore, it may be preferable to maintain a separate QOS system for each route segment.

It will be apparent to those skilled in the art that various modifications and variations can be made in the method and system for operation of a resilient closed communication network without a dedicated protection network segment of the present invention without departing from the spirit or scope of the invention. Thus, it is intended that the present invention covers the modifications and variations of this invention provided they come within the scope of the appended claims and their equivalents.

What is claimed is:

1. A method for operating a resilient closed communication network comprising at least one communication ring, the method comprising the steps of:
   receiving a data packet from a first external network at a first distributing station connected to the resilient closed communication network;
   identifying a second distributing station connected to the resilient closed communication network from which the data packet is to be forwarded to a second external network;
   determining functioning routes from the first distributing station to the second distributing station within the resilient closed communication network;
   selecting an optimal route among the functioning routes; and
   sending the data packet from the first distributing station to the second distributing station using the optimal route;
   wherein the selecting step includes the steps of:
   calculating an available traffic volume for each of the functioning routes;
   maintaining a distance table containing information necessary to determine an actual distance value for each of the functioning routes;
   finding optimal route candidates, which are routes with the smallest actual distance value among the functioning routes with a positive available traffic volume if at least one functioning route has a positive available traffic volume, routes with the smallest actual distance value among the functioning routes with an available traffic volume of zero if the largest available traffic volume for the functioning routes is zero, or routes with the largest available traffic volume if all the functioning routes have a negative available traffic volume; and
   choosing an optimal route from the optical route candidates.

2. The method according to claim 1, wherein the choosing step uses a preference value to select an optimal route when there are at least two optimal route candidates.

3. The method according to claim 2, further comprising the step of prioritizing an order of sending the data packet when the optimal route has a negative available traffic volume.

4. The method according to claim 3, wherein the prioritizing step uses information 10 contained in a transport layer of the data packet using an OSI model.

5. The method according to claim 1, further comprising the step of prioritizing an order of sending the data packet when the optimal route has a negative available traffic volume.

6. The method according to claim 5, wherein the prioritizing step uses information contained in a transport layer of the data packet using an OS1 model.

7. A method for operating a resilient closed communication network comprising at least one communication ring, the method comprising the steps of:
   receiving a data packet from a first external network at a first distributing station connected to the resilient closed communication network;
   identifying a second distributing station connected to the resilient closed communication network from which the data packet is to be forwarded to a second external network;
   determining functioning routes from the first distributing station to the second distributing station within the resilient closed communication network;
   selecting an optimal route among the functioning routes;
   sending the data packet from the first distributing station to the second distributing station using the optimal route;
   appending an identification number of the second distributing station to the data packet before it leaves the first distributing station;
   receiving the data packet at a third distributing station from the first distributing station; and
   forwarding the data packet to the second external network connected to the third distributing station after removing the identification number from the data packet, if the identification number of the third outstanding station is the same as the identification number appended to the data packet, or otherwise forwarding the data packet to a fourth distributing station that is different from the first distributing station.

8. The method according to claim 7, wherein optimization factors including an available traffic volume, an actual distance value, and a preference value are considered in the selecting step.

9. The method according to claim 7, wherein the selecting step includes the steps of:
   calculating an available traffic volume for each of the functioning routes;
   maintaining a distance table containing information necessary to determine an actual distance value for each of the functioning routes;

finding optimal route candidates, which are routes with the smallest actual distance value among the functioning routes with a positive available traffic volume if at least one of the functioning routes has a positive available traffic volume, routes with the smallest actual distance value among the functioning routes with an available traffic volume of zero if the largest available traffic volume for the functioning routes is zero, or routes with the largest available traffic volume if all the functioning routes have a negative available traffic volume; and choosing an optimal route from the optimal route candidates.

10. The method according to claim 9, wherein the choosing step uses a preference value to select an optimal route when there are at least two optimal route candidates.

11. The method according to claim 10, further comprising the step of prioritizing an order of sending the data packet when the optimal route has a negative available traffic volume.

12. The method according to claim 11, wherein the prioritizing step uses information contained in a transport layer of the data packet using an OSI model.

13. The method according to claim 9, further comprising the step of prioritizing an order of sending the data packet when the optimal route has a negative available traffic volume.

14. The method according to claim 13, wherein the prioritizing step uses information contained in a transport layer of the data packet using an OSI model.

15. The method according to claim 7, wherein no segment of the at least one communication ring is used as a dedicated protection segment.

16. The method according to claim 7, wherein the at least one communication ring is made of fiber optic cables.

17. The method for operating a resilient closed communication network comprising at least one communication ring, the method comprising the steps of:
 receiving a data packet from a first external network at a first distributing station connected to the resilient closed communication network;
 identifying a second distributing station connected to the resilient closed communication network from which the data packet is to be forwarded to a second external network;
 determining functioning routes from the first distributing station to the second distributing station within the resilient closed communication network;
 selecting an optimal route among the functioning routes; and
 sending the data packet from the first distributing station to the second distributing station using the optimal route;
 appending an identification number of the second distributing station and a route segment data specifying the optimal route to the data packet before it leaves the first distributing station;
 receiving the data packet at a third distributing station from the first distributing station; and
 forwarding the data packet to the second external network connected to the third distributing station after removing the identification number and the route segment data, if the identification number of the third distributing station is the same as the identification number appended to the data packet, or otherwise forwarding the data packet to a fourth distributing station that is different from the first distributing station using the route segment data.

18. The method according to claim 17, wherein the forwarding step further includes the steps of:
 if the identification number of the third distributing station is different from the identification number appended to the data pocket;
 extracting a route segment number of the route segment data;
 removing the route segment number obtained in the extracting step from the route segment data; and
 forwarding the data packet to a fourth distributing station using a route segment with the route segment number obtained in the extracting step.

19. The method according to claim 17, wherein optimization factors including an available traffic volume, an actual distance value, and a preference value are considered in the selecting step.

20. The method according to claim 17, wherein the selecting step includes the step of:
 calculating an available traffic volume for each of the functioning routes; maintaining a distance table containing information necessary to determine an actual distance value for each of the functioning routes;
 finding optimal route candidates, which are routes with the smallest actual distance value among the functioning routes with a positive available traffic volume if at least one of the functioning routes has a positive available traffic volume, routes with the smallest actual distance value among the functioning routes with an available traffic volume of zero if the largest available traffic volume for the functioning routes is zero, or routes with the largest available traffic volume if all the functioning routes have a negative available traffic volume; and
 choosing an optimal route from the optimal route candidates.

21. The method according to claim 20, wherein the choosing step uses a preference value to select an optimal route when there are at least two optimal route candidates.

22. The method according to claim 21, further comprising the step of prioritizing an order of sending the data packet when the optimal route has a negative available traffic volume.

23. The method according to claim 22, wherein the prioritizing step uses information contained in a transport layer of the data packet using an OSI model.

24. The method according to claim 20, further comprising the step of prioritizing an order of sending the data packet when the optimal route has a negative available traffic volume.

25. The method according to claim 24, wherein the prioritizing step uses information contained in a transport layer of the data packet using an OSI model.

26. The method according to claim 17, wherein no segment of the at least one communication ring is used as a dedicated protection segment.

27. The method according to claim 17, wherein the at least one communication ring is made of fiber optic cables.

28. The method of operating a resilient closed communication network comprising at least one communication ring, a first distributing station, and a second distributing station wherein the first and the second distributing stations are interconnected by the at least one communication ring and have a router and a packet distributor, the method comprising the steps of:
 receiving a data packet from a first external network at a first router in the first distributing station;

forwarding the data packet from the first router to a first packet distributor in the first distributing station;

identifying a network address of a second router in the second distributing station from which the data packet is to be forwarded to a second external network;

determining an identification number of a second packet distributor in the second distributing station;

appending the identification number of the second packet distributor to the data packet;

determining functioning routes from the first distributing station to the second distributing station within the resilient closed communication network;

selecting an optimal route among the functioning routes; and sending the data packet from the first distributing station to the second distributing station using the optimal route.

29. The method according to claim 28, wherein optimization factors including an available traffic volume, an actual distance value, and a preference value are considered in the selecting step.

30. The method according to claim 28, wherein the selecting step includes the steps of:

calculating an available traffic volume for each of the functioning routes;

maintaining a distance table containing information necessary to determine an actual distance value for each of the functioning routes;

finding optimal route candidates, which are routes with the smallest actual distance value among the functioning routes with a positive available traffic volume if at least one of the functioning routes has a positive available traffic volume, routes with the smallest actual distance value among the functioning routes with a traffic volume of zero if the largest available traffic volume of the functioning routes is zero, or routes with the largest available traffic volume if all the functioning routes have a negative available traffic volume; and choosing an optimal route from the optimal route candidates.

31. The method according to claim 30, wherein the choosing step uses a preference value to select an optimal route when there are at least two optimal route candidates.

32. The method according to claim 31, further comprising the step of prioritizing an order of sending the data packet when the optimal route has a negative available traffic volume.

33. The method according to claim 32, wherein the prioritizing step uses information contained in a transport layer of the data packet using an OSI model.

34. The method according to claim 30, further comprising the step of prioritizing an order of sending the data packet when the optimal route has a negative available traffic volume.

35. The method according to claim 34, wherein the prioritizing step uses information contained in a transport layer of the data packet using an OSI model.

36. The method according to claim 30, wherein no segment of at least one communication ring is used as a dedicated protection segment.

37. The method according to claim 30, wherein the at least one communication ring is made of fiber optic cables.

38. The method according to claim 28, further comprising the steps of:

receiving the data packet at a third packet distributor in a third distributing station from the first distributing station; and forwarding the data packet to a third router in the third distributing station from the third packet distributor for sending to the second external network connected to the third distributing station after removing the identification number from the data packet, if the identification number of the third packet distributor is the same as the identification number appended to the data packet, or otherwise forwarding the data packet to a fourth distributing station that is different from the first distributing station.

39. The method according to claim 38, wherein optimization factors including an available traffic volume, an actual distance value, and a preference value are considered in the selecting step.

40. The method according to claim 38, wherein the selecting step includes the steps of:

calculating an available traffic volume for each of the functioning routes;

maintaining a distance table contacting information necessary to determine an actual distance value for each of the functioning routes;

finding optimal route candidates, which are routes with the smallest actual distance-value among the functioning routes with a positive available traffic volume if at least one of the functioning routes has a positive available traffic volume, routes with the smallest actual distance value among the functioning routes with a traffic volume of zero if the largest available traffic volume of the functioning routes is zero, or routes with the largest available traffic volume if all the functioning routes have a negative available traffic volume; and choosing an optimal route from the optimal route candidates.

41. The method according to claim 40, wherein the choosing step uses a preference value to select an optimal route when there are at least two optimal route candidates.

42. The method according to claim 41, further comprising the step of prioritizing an order of sending the data packet when the optimal route has a negative available traffic volume.

43. The method according to claim 42, wherein the prioritizing step uses information contained in a transport layer of the data packet using an OSI model.

44. The method according to claim 40, further comprising the step of prioritizing an order of sending the data packet when the optimal route has a negative available traffic volume.

45. The method according to claim 44, wherein the prioritizing step uses information contained in a transport layer of the data packet using an OSI model.

46. The method according to claim 38, wherein no segment of the at least one communication ring is used as a dedicated protection segment.

47. The method according to claim 38, wherein the at least one communication ring is made of fiber optic cables.

48. The method according to claim 28 further comprising the steps of:

appending a route segment data for the optimal route to the data packet before the data packet leaves the first packet distributor; receiving the data packet at a third packet distributor in a third distributing station from the first distributing station; and forwarding the data packet to a third router in the third distributing station from the third packet distributor for sending to the second external network connected to the third distributing station after removing the identification number and the route segment data, if the identification number of the third packet distributor is the same as the identification number appended to the data packet, or otherwise forwarding to a fourth distributing station that is different from the first distributing station using the route segment data.

49. The method according to claim 48, wherein optimization factors including an available traffic volume, an actual distance value, and a preference value are considered in the selecting step.

50. The method according to claim 48, wherein the selecting step includes the step of:
calculating an available traffic volume for each of the functioning routes;
maintaining a distance table containing information necessary to determine an actual distance value for each of the functioning routes;
finding optimal route candidates, which are routes with the smallest actual distance value among the functioning routes with a positive available traffic volume if at least one of the functioning routes has a possible available traffic volume, routes with the smallest actual distance value among the functioning routes with a traffic volume of zero if the largest available traffic volume of the functioning routes is zero, or routes with the largest available traffic volume if all the functioning routes have a negative available traffic volume; and
choosing an optimal route from the optimal route candidates.

51. The method according to claim 50, wherein the choosing step uses a preference value to select an optimal route when there are at least two optimal route candidates.

52. The method according to claim 51, further comprising the step of prioritizing an order of sending the data packet when the optimal route has a negative available traffic volume.

53. The method according to claim 52, wherein the prioritizing step uses information contained in a transport layer of the data packet using an OSI model.

54. The method according to claim 50, further comprising the step of prioritizing an order of sending the data packet when the optimal route has a negative available traffic volume.

55. The method according to claim 54, wherein the prioritizing step uses information contained in a transport layer of the data packet using an OSI model.

56. The method according to claim 48, wherein no segment of the at least one communication ring is used as a dedicated protection segment.

57. The method according to claim 48, wherein the at least one communication ring is made of fiber optic cables.

58. The method according to claim 48, wherein the forwarding step further comprises the steps of:
if the identification number of the third packet distributor is different from the identification number appended to the data packet,
extracting a route segment number from the route segment data;
removing the route segment number obtained in the extracting step from the routes segment data; and
forwarding the data packet to a fourth distributing station using a route segment with the route segment number obtained in the extracting step.

59. The method according to claim 28, wherein no segment of the at least one communication ring is used as a dedicated protection segment.

60. The method according to claim 28, wherein the at least one communication ring is made of fiber optic cables.

61. The resilient closed communication network comprising:
a first communication ring; and
at least two distributing stations interconnected by the first communication ring, each distributing station including:
means for receiving the data packet from an external network or from another distributing station in the resilient closed communication network;
means for identifying a destination distributing station for the data packet received from the external network;
means for appending the identification number for the destination distributing station to the data packet received from the external network;
means for determining functioning routes to the destination distributing station within the resilient closed communication network;
means for selecting an optimal route among the functioning routes; and
means for forwarding to the external network after removing the identification number from the data packet if the identification number of the distributing station is the same as the identification number appended to the data packet, or otherwise forwarding the data packet to a next distributing station based on the optimal route.

62. The resilient closed communication network according to claim 61, wherein the selecting means considers optimization factors including an available traffic volume, an actual distance value, and a preference value.

63. The resilient closed communication network according to claim 61, wherein the selecting means includes:
means for calculating an available traffic volume for each of the functioning routes;
means for maintaining a distance table containing information necessary to determine an actual distance value for each of the functioning routes;
means for finding optimal route candidates, which are routes with the smallest actual distance value among the functioning routes with a positive available traffic volume if at least one of the functioning routes has a positive available traffic volume, routes with the smallest available traffic volume if the largest available traffic volume among the functioning routes is zero, or routes with the largest available traffic volume if all the functioning routes have a negative available traffic volume; and
means for choosing an optimal route from the optimal route candidates.

64. The resilient closed communication network according to claim 63, wherein the choosing means uses a preference value to choose an optimal route when there are at least two optimal route candidates.

65. The resilient closed communication network according to claim 64, wherein each distributing station further includes means for prioritizing an order of sending the data packet when the optimal routes has a negative available traffic volume.

66. The resilient closed communication network according to claim 65, wherein the prioritizing means uses information contained in a transport layer of the data packet using an OSI model.

67. The resilient closed communication network according to claim 63, wherein each distributing station further includes means for prioritizing an order of sending the data packet when the optimal route has a negative available traffic volume.

68. The resilient closed communication network according to claim 67, wherein the prioritizing means uses the information contained in a transport layer of the data packet using an OSI model.

69. The resilient closed communication network according to claim 63, wherein no segment of the first communication ring is used as a dedicated protection segment.

70. The resilient closed communication network according to claim 63, wherein the first communication ring is made of fiber optic cables.

71. The resilient closed communication network according to claim 61, wherein no segment of the first communication ring is used as a dedicated protection segment.

72. The resilient closed communication network according to claim 61, wherein the first communication ring is made of fiber optic cables.

73. The resilient closed communication network comprising:
   a first communication ring; and
   at least two distributing stations interconnected by the first communication ring, each distributing station including:
      means for receiving a data packet from an external network or from another distributing station in the resilient closed communication network;
      means for identifying a destination distributing station for the data packet received from the external network;
      means for appending the identification number for the destination distributing station to the data packet received from the external network;
      means for determining functioning routes to the destination distributing station within the resilient closed communication network;
      means for selecting an optimal route among the functioning routes;
      means for appending a route segment data for the optimal route to the data packet received from the external network, and
      means for forwarding to the external network after removing the identification number and the route segment data from the data packet if the identification number of the distributing station is the same as the identification number appended to the data packet, or otherwise forwarding to a next distributing station using a route segment specified in the route segment data after updating the route segment data.

74. The resilient closed communication network according to claim 73, wherein the selecting means considers optimization factors including an available traffic volume, an actual distance value, and a preference value.

75. The resilient closed communication network according to claim 73, wherein the selecting means includes:
   means for calculating an available traffic volume for each of the functioning routes;
   means for maintaining a distance table containing information necessary to determine an actual distance value for each of the functioning routes;
   means for finding optimal route candidates, which are routes with the smallest actual distance value among the functioning routes with a positive available traffic volume if at least one of the functioning routes have a positive available traffic volume, routes with the smallest available traffic volume if the largest available traffic volume among the functioning routes is zero, or routes with the largest available traffic volume if all the functioning routes have a negative available traffic volume; and
   means for choosing an optimal route from the optimal route candidates.

76. The resilient closed communication network according to claim 75, wherein the choosing means uses a preference value to choose an optimal route when there are at least two optimal route candidates.

77. The resilient closed communication network according to claim 70, wherein each distributing station further includes means for prioritizing an order of sending the data packet when the optimal routes has a negative available traffic volume.

78. The resilient closed communication network according to claim 77, wherein the prioritizing means uses information contained in a transport layer of the data packet using OSI method.

79. The resilient closed communication network according to claim 75, wherein each distributing station further includes means for prioritizing an order of sending the data packet when the optimal route has a negative available traffic volume.

80. The resilient closed communication network according to claim 79, wherein the prioritizing means uses information contained in a transport layer of the data packet using an OSI model.

81. The resilient closed communication network according to claim 75, wherein no segment of the first communication ring is used as a dedicated protection segment.

82. The resilient closed communication network according to claim 75, wherein the first communication ring is made of fiber optic cables.

83. The resilient closed communication network according to claim 73, wherein no segment of the first communication ring is used as a dedicated protection segment.

84. The resilient closed communication network according to claim 73, wherein the first communication ring is made of fiber optic cables.

85. The resilient closed communication network comprising: a first communication ring; and
   at least two distributing stations interconnected by the first communication ring, each distributing station including:
      a router capable of receiving a data packet from an external network connected to the distributing station and of forwarding the data packet to the external network connected to the distributing station; and
   a packet distributor comprising:
      means for receiving a data packet from the router in the same distributing station or from another distributing station in the resilient closed communication network;
      means for identifying a network address of a destination router in the destination distributing station for the data packet received from the router in the same distributing station;
      means for determining an identification number of a destination packet distributor in the destination distributing station;
      means for appending the identification number of the destination packet distributor to the data packet received from the router in the same distributing station;
      means for determining functioning routes to the destination distributing station within the resilient closed communication network;

means for selecting an optimal route among the functioning routes; and means for forwarding the data packet to the router in the same distributing station after removing the identification number from the data packet if the identification number of the distributing station is the same as the identification number appended to the data packet, or otherwise forwarding the data packet to a next distributing station.

86. The resilient closed communication network according to claim 85, wherein the selecting means considers optimization factors including an available traffic volume, an actual distance value, and a preference value.

87. The resilient closed communication network according to claim 85, wherein the selecting means includes:

means for calculating available traffic volume for each of the functioning routes;

means for maintaining a distance table containing information necessary to determine an actual distance value for each of the functioning routes;

means for finding optimal route candidates, which are routes with the smallest actual distance value among the functioning routes with a positive available traffic volume if at least one of the functioning routes has a positive available traffic volume, routes with the smallest available traffic volume if the largest available traffic volume among the functioning routes is zero, or routes with the largest available traffic volume if all the functioning routes have a negative available traffic volume; and means for choosing an optimal route from the optimal route candidates.

88. The resilient closed communication network according to claim 87, wherein the choosing means uses a preference value to select an optimal route when there are at least two optimal route candidates.

89. The resilient closed communication network according to claim 88, wherein each distributing station further includes means for prioritizing an order of sending the data packet when the optimal routes has a negative available traffic volume.

90. The resilient closed communication network according to claim 89, wherein the prioritizing means uses information contained in a transport layer of the data packet using an OSI method.

91. The resilient closed communication network according to claim 87, wherein each distributing station further includes means for prioritizing an order of sending the data packet when the optimal routes has a negative available traffic volume.

92. The resilient closed communication network according to claim 91, wherein the prioritizing means uses information contained in a transport layer of the data packet using an CSI model.

93. The resilient closed communication network according to claim 87, wherein no segment of the first communication ring is used as a dedicated protection segment.

94. The resilient closed communication network according to claim 87, wherein the first communication ring is made of fiber optic cables.

95. The resilient closed communication network according to claim 85, wherein no segment of the first communication ring is used as a dedicated protection segment.

96. The resilient closed communication network according to claim 85, wherein the first communication network according to claim 89, wherein the first communication ring is made of fiber optic cables.

97. The resilient closed communication network comprising:

a first communication ring; and at least two distributing stations interconnected by the first communication ring, each distributing station including:

a route capable of receiving a data packet from an external network connected to the distributing station and of forwarding the data packet to the external network connected to the distributing station; and a packet distributor comprising:

means for receiving a data packet from the router in the same distributing station or from another distributing station in the resilient closed communication network;

means for identifying a network address of a destination router in the destination distributing station for the data packet received from the router in the same distributing station;

means for determining an identification number of a destination packet distributor in the destination distributing station;

means for appending the identification number of the destination packet distributor to the data packet received from the router in the same distributing station;

means for determining functioning routes to the destination distributing station which the resilient closed communication network;

means for selecting an optimal router among the functioning routes;

means for appending a route segment data for the optimal route to the data packet received from the route in the same distributing station; and means for forwarding the data packet to the router in the same distributing station after removing the identification number and the router segment data from the data packet if the identification number of the distributing station is the same as the identification number appended to the data packet, or otherwise forwarding to a next distributing station using a route segment specified in the route segment data after updating the route segment data.

98. The resilient closed communication network according to claim 97, wherein the selecting means considers optimization factors including an available traffic volume, an actual distance value, and a preference value.

99. The resilient closed communication network according to claim 97, wherein the selecting means includes:

means for calculating available traffic volume for each of the functioning routes;

means for maintaining a distance table containing information necessary to determine an actual distance value for each of the functioning routes;

means for finding optimal route candidates, which are routes with the smallest actual distance value among the functioning routes with a positive available traffic volume if at least one of the functioning routes has a positive available traffic volume, routes with the smallest available traffic volume if the largest available traffic volume among the functioning routes is zero, or routes with the largest available traffic volume if all the functioning routes have a negative available traffic volume; and means for choosing an optimal route from the optimal route candidates.

100. The resilient closed communication network according to claim 99, wherein the choosing means uses a preference value to select an optimal route when there are at least two optimal route candidates.

101. The resilient closed communication network according to claim 100, wherein each distributing station further includes means for prioritizing an order of sending the data packet when the optimal routes has a negative available traffic volume.

102. The resilient closed communication network according to claim 101, wherein the prioritizing means uses information contained in a transport layer of the data packet using an OSI model.

103. The resilient closed communication network according to claim 99, wherein each distributing station further includes means for prioritizing an order of sending the data packet when the optimal routes has a negative available traffic volume.

104. The resilient closed communication network according to claim 103, wherein the prioritizing means uses information contained in a transport layer of the data packet using an OSI method.

105. The resilient closed communication network according to claim 99, wherein no segment of the first communication ring is used as a dedicated protection segment.

106. The resilient closed communication network according to claim 99, wherein the first communication ring is made of fiber optic cables.

107. The resilient closed communication network according to claim 97, wherein no segment of the first communication ring is used as a dedicated protection segment.

108. The resilient closed communication network according to claim 97, wherein the first communication ring is made of fiber optic cables.

* * * * *